United States Patent
Campbell et al.

(10) Patent No.: US 10,664,652 B2
(45) Date of Patent: May 26, 2020

(54) SEAMLESS GRID AND CANVAS INTEGRATION IN A SPREADSHEET APPLICATION

(71) Applicant: MICROSOFT TECHNOLOGY LICENSING, LLC, Redmond, WA (US)

(72) Inventors: John Campbell, Renton, WA (US); Sam C Radakovitz, Puyallup, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 29 days.

(21) Appl. No.: 13/918,914

(22) Filed: Jun. 15, 2013

(65) Prior Publication Data

US 2014/0372858 A1 Dec. 18, 2014

(51) Int. Cl.
*G06F 17/00* (2019.01)
*G06F 40/18* (2020.01)

(52) U.S. Cl.
CPC .................................. *G06F 40/18* (2020.01)

(58) Field of Classification Search
CPC .... G06F 17/246; G06F 17/245; G06F 3/0489; G06F 3/04845; G06F 17/22;
(Continued)

(56) References Cited

U.S. PATENT DOCUMENTS

| 5,095,429 A | 3/1992 | Harris et al. |
| 5,212,788 A | 5/1993 | Lomet et al. |

(Continued)

FOREIGN PATENT DOCUMENTS

| AU | 2006291313 A1 | 3/2007 |
| CA | 2616563 A1 | 3/2007 |

(Continued)

OTHER PUBLICATIONS

"iWork—Numbers—Create perfect spreadsheets in minutes.", Retrieved on: Apr. 26, 2013, Available at: http://www.apple.com/in/iwork/numbers/#spreadsheet, 3 pgs.

(Continued)

*Primary Examiner* — Jason T Edwards
(74) *Attorney, Agent, or Firm* — Merchant & Gould

(57) ABSTRACT

Seamless grid and canvas integration in a spreadsheet application is provided. One or more data items may be pulled from a grid-structured spreadsheet and may be allowed to "float" on the grid-structure spreadsheet without regard to the underlying grid. The floating object may be pushed or inserted back into the grid of the same or different spreadsheet at any location. A pulled data object also may be dropped onto a grid-less canvas user interface object and may be moved about on the canvas object in a free form manner. References between data and computations in the moved data object are structured and maintained so that the data object may be manipulated and increased/decreased without adversely affecting the underlying grid and such that both data and computational references between the data object and the underlying grid are maintained.

22 Claims, 14 Drawing Sheets

(58) Field of Classification Search
CPC ...... G06F 17/211; G06F 17/21; G06F 17/218;
G06F 3/0486; G06F 17/212; G06F
3/04847; G06F 3/0488; G06F 3/04883
USPC ........................................................ 715/220
See application file for complete search history.

(56) References Cited

U.S. PATENT DOCUMENTS

| | | |
|---|---|---|
| 5,249,296 A | 9/1993 | Tanaka |
| 5,339,392 A | 8/1994 | Risberg et al. |
| 5,371,675 A | 12/1994 | Greif et al. |
| 5,403,639 A | 4/1995 | West et al. |
| 5,418,902 A | 5/1995 | West et al. |
| 5,423,034 A | 6/1995 | Cohen et al. |
| 5,452,447 A | 9/1995 | Nelson et al. |
| 5,455,945 A | 10/1995 | Vanderdrift |
| 5,555,403 A | 9/1996 | Cambot et al. |
| 5,581,670 A | 12/1996 | Bier et al. |
| 5,581,760 A | 12/1996 | Atkinson |
| 5,604,854 A | 2/1997 | Glassey |
| 5,613,058 A | 3/1997 | Koppolu et al. |
| 5,664,127 A * | 9/1997 | Anderson ............ G06F 3/0481 715/209 |
| 5,669,005 A | 9/1997 | Curbow et al. |
| 5,694,608 A | 12/1997 | Shostak |
| 5,708,827 A | 1/1998 | Kaneko et al. |
| 5,717,939 A | 3/1998 | Bricklin et al. |
| 5,727,161 A | 3/1998 | Purcell, Jr. |
| 5,745,714 A | 4/1998 | Glass et al. |
| 5,819,292 A | 10/1998 | Hitz et al. |
| 5,848,187 A | 12/1998 | Bricklin et al. |
| 5,852,439 A | 12/1998 | Musgrove et al. |
| 5,883,623 A | 3/1999 | Cseri |
| 5,890,174 A | 3/1999 | Khanna et al. |
| 5,893,125 A | 4/1999 | Shostak |
| 5,899,988 A | 5/1999 | Depledge et al. |
| 5,978,818 A | 11/1999 | Lin et al. |
| 5,987,481 A | 11/1999 | Michelman et al. |
| 6,003,012 A | 12/1999 | Nick |
| 6,009,455 A | 12/1999 | Doyle |
| 6,023,691 A | 2/2000 | Bertrand et al. |
| 6,038,639 A | 3/2000 | O'Brien et al. |
| 6,097,391 A * | 8/2000 | Wilcox ............... G06F 3/0481 715/776 |
| 6,157,934 A | 12/2000 | Khan et al. |
| 6,160,549 A | 12/2000 | Touma et al. |
| 6,199,099 B1 | 3/2001 | Gershman et al. |
| 6,216,138 B1 | 4/2001 | Wells et al. |
| 6,247,008 B1 | 6/2001 | Cambot et al. |
| 6,249,606 B1 | 6/2001 | Kiraly et al. |
| 6,256,651 B1 | 7/2001 | Tuli |
| 6,269,403 B1 | 7/2001 | Anders |
| 6,298,334 B1 | 10/2001 | Burfield et al. |
| 6,323,846 B1 | 11/2001 | Westerman et al. |
| 6,360,246 B1 | 3/2002 | Begley et al. |
| 6,411,313 B1 | 6/2002 | Conlon et al. |
| 6,412,070 B1 | 6/2002 | Van Dyke et al. |
| 6,460,059 B1 | 10/2002 | Wisniewski |
| 6,484,186 B1 | 11/2002 | Rungta |
| 6,490,593 B2 | 12/2002 | Proctor |
| 6,501,491 B1 | 12/2002 | Brown et al. |
| 6,507,865 B1 | 1/2003 | Hanson et al. |
| 6,578,027 B2 | 6/2003 | Cambot et al. |
| 6,592,626 B1 | 7/2003 | Bauchot et al. |
| 6,613,098 B1 | 9/2003 | Sorge et al. |
| 6,625,603 B1 | 9/2003 | Garg et al. |
| 6,626,959 B1 | 9/2003 | Moise et al. |
| 6,631,497 B1 | 10/2003 | Jamshidi |
| 6,631,498 B1 | 10/2003 | McCauley et al. |
| 6,632,249 B2 | 10/2003 | Pollock |
| 6,633,851 B1 | 10/2003 | Engler et al. |
| 6,651,075 B1 | 11/2003 | Kusters et al. |
| 6,662,341 B1 | 12/2003 | Cooper et al. |
| 6,691,100 B1 | 2/2004 | Alavi et al. |
| 6,701,485 B1 | 3/2004 | Igra et al. |
| 6,757,867 B2 | 6/2004 | Bauchot et al. |
| 6,775,675 B1 | 8/2004 | Nwabueze et al. |
| 6,801,910 B1 | 10/2004 | Bedell et al. |
| 6,832,351 B1 | 12/2004 | Batres |
| 6,892,211 B2 | 5/2005 | Hitz et al. |
| 6,906,717 B2 | 6/2005 | Couckuyt et al. |
| 6,961,905 B1 | 11/2005 | Cover et al. |
| 6,988,241 B1 | 1/2006 | Guttman et al. |
| 6,990,632 B2 | 1/2006 | Rothchiller et al. |
| 6,993,533 B1 | 1/2006 | Barnes |
| 7,013,312 B2 | 3/2006 | Bala et al. |
| 7,015,911 B2 | 3/2006 | Shaughnessy et al. |
| 7,017,112 B2 | 3/2006 | Collie et al. |
| 7,031,979 B2 | 4/2006 | Kauffman |
| 7,047,380 B2 | 5/2006 | Tormasov et al. |
| 7,231,657 B2 | 6/2007 | Honarvar et al. |
| 7,234,107 B1 | 6/2007 | Aoki et al. |
| 7,441,197 B2 | 10/2008 | Tschiegg et al. |
| 7,469,381 B2 | 12/2008 | Ording |
| 7,519,223 B2 | 4/2009 | Dehlin et al. |
| 7,580,928 B2 | 8/2009 | Wu et al. |
| 7,584,414 B2 | 9/2009 | Mortensen |
| 7,640,469 B2 | 12/2009 | Arnold et al. |
| 7,640,496 B1 | 12/2009 | Chaulk et al. |
| 7,650,644 B2 | 1/2010 | Cheng et al. |
| 7,657,571 B2 | 2/2010 | Battagin et al. |
| 7,660,843 B1 | 2/2010 | Atkinson et al. |
| 7,673,340 B1 | 3/2010 | Cohen et al. |
| 7,676,763 B2 | 3/2010 | Rummel |
| 7,680,823 B2 | 3/2010 | Garfinkle et al. |
| 7,730,425 B2 | 6/2010 | los Reyes et al. |
| 7,752,536 B2 | 7/2010 | Megiddo et al. |
| 7,792,847 B2 | 9/2010 | Dickerman et al. |
| 7,797,621 B1 * | 9/2010 | Danner ................ G06F 17/246 715/220 |
| 7,805,437 B1 | 9/2010 | Andersson et al. |
| 7,908,549 B2 | 3/2011 | Khen et al. |
| 7,949,937 B2 | 5/2011 | Wu et al. |
| 8,121,975 B2 | 2/2012 | Averbuch et al. |
| 8,245,156 B2 | 8/2012 | Mouilleseaux et al. |
| 8,255,789 B2 | 8/2012 | Berger et al. |
| 8,274,534 B2 | 9/2012 | Montague |
| 8,279,174 B2 | 10/2012 | Jee et al. |
| 8,321,781 B2 | 11/2012 | Tolle |
| 8,352,423 B2 | 1/2013 | Phillips et al. |
| 8,381,133 B2 | 2/2013 | Iwema et al. |
| 8,392,890 B2 | 3/2013 | Miller |
| 8,416,217 B1 | 4/2013 | Eriksson et al. |
| 8,468,444 B2 | 6/2013 | Middlefart |
| 8,549,432 B2 | 10/2013 | Warner |
| 8,566,953 B2 | 10/2013 | Campbell et al. |
| 8,601,389 B2 | 12/2013 | Schulz et al. |
| 8,719,251 B1 | 5/2014 | English et al. |
| 8,817,053 B2 | 8/2014 | Robert et al. |
| 8,854,433 B1 | 10/2014 | Rafii |
| 8,943,142 B1 | 1/2015 | Simon et al. |
| 9,003,298 B2 | 4/2015 | Hoke et al. |
| 9,053,083 B2 | 6/2015 | Waldman et al. |
| 9,171,099 B2 | 10/2015 | Prish et al. |
| 9,514,116 B2 | 12/2016 | Waldman et al. |
| 9,747,270 B2 | 8/2017 | Campbell et al. |
| 10,180,714 B1 | 1/2019 | Kin et al. |
| 2001/0055013 A1 | 12/2001 | Fuki |
| 2002/0010743 A1 | 1/2002 | Ryan et al. |
| 2002/0015059 A1 | 2/2002 | Clarke |
| 2002/0049778 A1 | 4/2002 | Bell et al. |
| 2002/0065846 A1 | 5/2002 | Ogawa et al. |
| 2002/0070953 A1 | 6/2002 | Barg et al. |
| 2002/0077803 A1 | 6/2002 | Kudoh et al. |
| 2002/0077842 A1 | 6/2002 | Charisius et al. |
| 2002/0078086 A1 | 6/2002 | Alden et al. |
| 2002/0099824 A1 | 7/2002 | Bender et al. |
| 2002/0113822 A1 | 8/2002 | Windl et al. |
| 2002/0129054 A1 | 9/2002 | Ferguson et al. |
| 2002/0143780 A1 | 10/2002 | Gorman |
| 2002/0158887 A1 | 10/2002 | Samra et al. |
| 2002/0184131 A1 | 12/2002 | Gatto |
| 2003/0011638 A1 | 1/2003 | Chung |
| 2003/0016247 A1 | 1/2003 | Lai et al. |

(56) References Cited

U.S. PATENT DOCUMENTS

| | | |
|---|---|---|
| 2003/0018644 A1 | 1/2003 | Bala et al. |
| 2003/0033329 A1 | 2/2003 | Bergman et al. |
| 2003/0044762 A1 | 3/2003 | Bergan et al. |
| 2003/0051209 A1 | 3/2003 | Androski et al. |
| 2003/0061305 A1 | 3/2003 | Copley et al. |
| 2003/0065638 A1 | 4/2003 | Robert |
| 2003/0066030 A1 | 4/2003 | Curns et al. |
| 2003/0071814 A1 | 4/2003 | Jou et al. |
| 2003/0088586 A1 | 5/2003 | Fitzpatrick et al. |
| 2003/0105765 A1 | 6/2003 | Smith et al. |
| 2003/0120999 A1 | 6/2003 | Miller et al. |
| 2003/0164817 A1* | 9/2003 | Graham et al. ............... 345/157 |
| 2003/0169295 A1 | 9/2003 | Becerra, Jr. |
| 2003/0212960 A1 | 11/2003 | Shaughnessy et al. |
| 2003/0226105 A1 | 12/2003 | Waldau |
| 2004/0003353 A1 | 1/2004 | Rivera et al. |
| 2004/0006539 A1 | 1/2004 | Royer et al. |
| 2004/0015783 A1 | 1/2004 | Lennon et al. |
| 2004/0049465 A1 | 3/2004 | Engler et al. |
| 2004/0060001 A1 | 3/2004 | Coffen |
| 2004/0064449 A1 | 4/2004 | Ripley et al. |
| 2004/0100501 A1* | 5/2004 | Dornback ............ G06F 3/0486 715/769 |
| 2004/0103366 A1 | 5/2004 | Peyton-Jones et al. |
| 2004/0117731 A1 | 6/2004 | Blyashov |
| 2004/0119727 A1 | 6/2004 | Dietz et al. |
| 2004/0125130 A1 | 7/2004 | Flamini et al. |
| 2004/0128147 A1 | 7/2004 | Vallinayagam et al. |
| 2004/0143788 A1 | 7/2004 | Aureglia et al. |
| 2004/0168115 A1 | 8/2004 | Bauernschmidt et al. |
| 2004/0174397 A1 | 9/2004 | Cereghini et al. |
| 2004/0181748 A1 | 9/2004 | Jamshidi |
| 2004/0199867 A1 | 10/2004 | Brandenborg |
| 2004/0205595 A1 | 10/2004 | DelGobbo et al. |
| 2004/0205638 A1* | 10/2004 | Thomas et al. ............... 715/526 |
| 2004/0221233 A1 | 11/2004 | Thielen |
| 2004/0260673 A1 | 12/2004 | Hitz et al. |
| 2004/0268364 A1 | 12/2004 | Faraj |
| 2005/0039114 A1 | 2/2005 | Naimat et al. |
| 2005/0039144 A1 | 2/2005 | Wada et al. |
| 2005/0044496 A1 | 2/2005 | Kotler et al. |
| 2005/0049906 A1 | 3/2005 | Leymann et al. |
| 2005/0068290 A1* | 3/2005 | Jaeger ................ G06F 3/04845 345/156 |
| 2005/0097146 A1 | 5/2005 | Konstantinou et al. |
| 2005/0102608 A1 | 5/2005 | Batres |
| 2005/0108052 A1 | 5/2005 | Omaboe |
| 2005/0114661 A1 | 5/2005 | Cheng et al. |
| 2005/0144554 A1 | 6/2005 | Salmon et al. |
| 2005/0165829 A1 | 7/2005 | Varasano |
| 2005/0166159 A1* | 7/2005 | Mondry ................ G06F 3/0486 715/769 |
| 2005/0210389 A1 | 9/2005 | Middelfart |
| 2005/0240985 A1 | 10/2005 | Alkove et al. |
| 2005/0268215 A1 | 12/2005 | Battagin et al. |
| 2005/0275622 A1 | 12/2005 | Patel et al. |
| 2005/0278647 A1 | 12/2005 | Leavitt et al. |
| 2005/0289136 A1 | 12/2005 | Wu et al. |
| 2006/0013462 A1 | 1/2006 | Sadikali |
| 2006/0055662 A1 | 3/2006 | Rimas-Ribikauskas |
| 2006/0069696 A1* | 3/2006 | Becker et al. ................ 707/102 |
| 2006/0168536 A1 | 7/2006 | Portmann |
| 2006/0233257 A1 | 10/2006 | Keith et al. |
| 2006/0265641 A1 | 11/2006 | Garfinkle et al. |
| 2006/0288267 A1 | 12/2006 | DeSpain |
| 2007/0028159 A1 | 2/2007 | Ying |
| 2007/0050416 A1 | 3/2007 | Battagin et al. |
| 2007/0061669 A1 | 3/2007 | Major et al. |
| 2007/0061698 A1 | 3/2007 | Megiddo et al. |
| 2007/0061699 A1 | 3/2007 | Battagin et al. |
| 2007/0130517 A1 | 6/2007 | Wu |
| 2007/0136653 A1 | 6/2007 | Khen et al. |
| 2007/0143715 A1 | 6/2007 | Hollins et al. |
| 2007/0176898 A1 | 8/2007 | Suh |
| 2007/0233811 A1 | 10/2007 | Rochelle et al. |
| 2007/0260585 A1 | 11/2007 | Bodine et al. |
| 2007/0266342 A1 | 11/2007 | Chang et al. |
| 2008/0005678 A1 | 1/2008 | Buttner et al. |
| 2008/0010670 A1 | 1/2008 | Campbell et al. |
| 2008/0036743 A1 | 2/2008 | Westerman et al. |
| 2008/0046462 A1 | 2/2008 | Kaufman et al. |
| 2008/0046803 A1 | 2/2008 | Beauchamp et al. |
| 2008/0195930 A1 | 8/2008 | Tolle |
| 2008/0204476 A1 | 8/2008 | Montague |
| 2008/0235352 A1 | 9/2008 | Yolleck et al. |
| 2008/0270886 A1 | 10/2008 | Gossweiler et al. |
| 2008/0271127 A1 | 10/2008 | Naibo et al. |
| 2008/0271227 A1 | 11/2008 | Mollo |
| 2008/0294751 A1 | 11/2008 | Dreiling |
| 2008/0307385 A1 | 12/2008 | Dreiling et al. |
| 2009/0019063 A1 | 1/2009 | Gandhi et al. |
| 2009/0083619 A1 | 3/2009 | Davis |
| 2009/0100345 A1 | 4/2009 | Miller |
| 2009/0100360 A1 | 4/2009 | Janzen et al. |
| 2009/0109187 A1 | 4/2009 | Noma |
| 2009/0158190 A1 | 6/2009 | Higginson |
| 2009/0198566 A1 | 8/2009 | Greenberg |
| 2009/0198683 A1 | 8/2009 | Robertson et al. |
| 2009/0217147 A1 | 8/2009 | Thomsen |
| 2009/0254572 A1 | 10/2009 | Redlich et al. |
| 2009/0271735 A1 | 10/2009 | Anderson et al. |
| 2009/0300544 A1 | 12/2009 | Psenka et al. |
| 2009/0307623 A1 | 12/2009 | Agarawala et al. |
| 2009/0307762 A1 | 12/2009 | Cudd, Jr. |
| 2009/0309849 A1 | 12/2009 | Iwema et al. |
| 2009/0313268 A1 | 12/2009 | Folting et al. |
| 2009/0327964 A1 | 12/2009 | Mouilleseaux et al. |
| 2009/0328010 A1 | 12/2009 | Cao |
| 2010/0026649 A1 | 2/2010 | Simizu |
| 2010/0031152 A1 | 2/2010 | Villaron et al. |
| 2010/0031167 A1 | 2/2010 | Roytman |
| 2010/0077344 A1 | 3/2010 | Gaffney et al. |
| 2010/0094658 A1 | 4/2010 | Mok et al. |
| 2010/0100854 A1 | 4/2010 | Russell et al. |
| 2010/0131529 A1 | 5/2010 | Kasera et al. |
| 2010/0136957 A1 | 6/2010 | Horodezky et al. |
| 2010/0192103 A1 | 7/2010 | Cragun et al. |
| 2010/0214322 A1 | 8/2010 | Lim et al. |
| 2010/0229090 A1 | 9/2010 | Newton et al. |
| 2010/0235794 A1 | 9/2010 | Ording |
| 2010/0262900 A1 | 10/2010 | Romatier et al. |
| 2010/0306702 A1 | 12/2010 | Warner |
| 2010/0318890 A1 | 12/2010 | Billharz et al. |
| 2010/0325526 A1 | 12/2010 | Ellis et al. |
| 2010/0333044 A1 | 12/2010 | Kethireddy |
| 2011/0041087 A1* | 2/2011 | Leveille ................ G06T 11/206 715/765 |
| 2011/0074699 A1 | 3/2011 | Marr et al. |
| 2011/0087954 A1 | 4/2011 | Dickerman et al. |
| 2011/0145299 A1 | 6/2011 | Zhou |
| 2011/0145689 A1 | 6/2011 | Campbell et al. |
| 2011/0154268 A1 | 6/2011 | Trent, Jr. et al. |
| 2011/0163968 A1 | 7/2011 | Hogan |
| 2011/0164058 A1 | 7/2011 | Lemay |
| 2011/0283176 A1 | 11/2011 | Zulian |
| 2011/0320563 A1 | 12/2011 | Seo |
| 2012/0011195 A1 | 1/2012 | Prish |
| 2012/0013539 A1 | 1/2012 | Hogan et al. |
| 2012/0013540 A1 | 1/2012 | Hogan |
| 2012/0023449 A1 | 1/2012 | Zabielski |
| 2012/0030567 A1 | 2/2012 | Victor |
| 2012/0072820 A1 | 3/2012 | Weinman, Jr. |
| 2012/0173963 A1 | 7/2012 | Hoke et al. |
| 2012/0180002 A1 | 7/2012 | Campbell et al. |
| 2012/0198374 A1 | 8/2012 | Zhang et al. |
| 2012/0212438 A1 | 8/2012 | Vaisanen |
| 2012/0221933 A1 | 8/2012 | Heiney et al. |
| 2012/0226967 A1 | 9/2012 | Oh |
| 2012/0254782 A1* | 10/2012 | Van Ieperen et al. ........ 715/765 |
| 2012/0254783 A1 | 10/2012 | Pourshahid et al. |
| 2012/0272192 A1 | 10/2012 | Grossman et al. |
| 2012/0330955 A1 | 12/2012 | Miura |
| 2012/0330995 A1 | 12/2012 | Muenkel |
| 2013/0013993 A1 | 1/2013 | Oh |

(56) References Cited

U.S. PATENT DOCUMENTS

| | | | |
|---|---|---|---|
| 2013/0061122 A1 | 3/2013 | Sethi et al. | |
| 2013/0111320 A1 | 5/2013 | Campbell et al. | |
| 2013/0117651 A1 | 5/2013 | Waldman et al. | |
| 2013/0117653 A1* | 5/2013 | Sukhanov | G06F 17/212 715/227 |
| 2013/0159832 A1 | 6/2013 | Ingargiola et al. | |
| 2013/0159833 A1* | 6/2013 | Look et al. | 715/230 |
| 2013/0174025 A1 | 7/2013 | Lee et al. | |
| 2013/0198323 A1 | 8/2013 | Prish et al. | |
| 2013/0212470 A1 | 8/2013 | Karunamuni et al. | |
| 2013/0212541 A1 | 8/2013 | Dolenc et al. | |
| 2013/0229373 A1 | 9/2013 | Eriksson et al. | |
| 2013/0321283 A1 | 12/2013 | Mak | |
| 2013/0321285 A1 | 12/2013 | Hoyer | |
| 2013/0321308 A1 | 12/2013 | Lee | |
| 2013/0339903 A1 | 12/2013 | Cheng et al. | |
| 2014/0019842 A1 | 1/2014 | Montagna et al. | |
| 2014/0032575 A1 | 1/2014 | Kiang et al. | |
| 2014/0033093 A1 | 1/2014 | Brauninger et al. | |
| 2014/0194162 A1 | 7/2014 | Tsudik | |
| 2014/0310649 A1 | 10/2014 | Berstein et al. | |
| 2014/0358733 A1 | 12/2014 | Achuthan et al. | |
| 2014/0372856 A1 | 12/2014 | Radakovitz et al. | |
| 2014/0372932 A1 | 12/2014 | Rutherford et al. | |
| 2015/0161095 A1 | 6/2015 | Wang et al. | |
| 2015/0347372 A1 | 12/2015 | Waldman et al. | |
| 2016/0041964 A1 | 2/2016 | Prish et al. | |
| 2017/0300222 A1 | 10/2017 | Campbell et al. | |

FOREIGN PATENT DOCUMENTS

| | | |
|---|---|---|
| CA | 2618224 A1 | 3/2007 |
| CN | 102016795 A | 6/1989 |
| CN | 1578949 A | 2/2005 |
| CN | 1655120 A | 8/2005 |
| CN | 1755679 | 4/2006 |
| CN | 1790325 A | 6/2006 |
| CN | 1877505 A | 12/2006 |
| CN | 1904879 A | 1/2007 |
| CN | 101013954 A | 8/2007 |
| CN | 101258485 A | 9/2008 |
| CN | 101263453 A | 9/2008 |
| CN | 101300564 | 11/2008 |
| CN | 101326520 A | 12/2008 |
| CN | 101371255 A | 2/2009 |
| CN | 101404009 A | 4/2009 |
| CN | 102334098 A | 4/2009 |
| CN | 101553812 A | 10/2009 |
| CN | 101882108 A | 11/2010 |
| CN | 101983388 A | 3/2011 |
| CN | 103034708 | 4/2013 |
| CN | 103049476 A | 4/2013 |
| EP | 798655 A2 | 10/1997 |
| EP | 0990972 A1 | 4/2000 |
| EP | 1037157 A1 | 9/2000 |
| EP | 1367514 A1 | 12/2003 |
| EP | 1603053 A2 | 12/2005 |
| EP | 1922939 A1 | 5/2008 |
| EP | 1979804 | 10/2008 |
| GB | 2354851 A | 4/2001 |
| JP | H01165795 A | 6/1989 |
| JP | 03-268185 A | 11/1991 |
| JP | 043477 A | 1/1992 |
| JP | 06-028349 A | 2/1994 |
| JP | H06139261 A | 5/1994 |
| JP | 07-334696 A | 12/1995 |
| JP | 8-500200 | 1/1996 |
| JP | H1027089 A | 1/1998 |
| JP | H069480 A | 3/1998 |
| JP | 10-508403 A | 8/1998 |
| JP | H10214264 A | 8/1998 |
| JP | H11-143606 | 5/1999 |
| JP | 2000056888 A | 2/2000 |
| JP | 2001092444 | 4/2001 |
| JP | 2001109741 A | 4/2001 |
| JP | 2001312442 A | 11/2001 |
| JP | 2001357343 A | 12/2001 |
| JP | 2002-140159 | 5/2002 |
| JP | 2002189595 A | 7/2002 |
| JP | 2003050964 A | 2/2003 |
| JP | 2003108440 A | 4/2003 |
| JP | 2003281128 A | 10/2003 |
| JP | 2003533755 T | 11/2003 |
| JP | 2004145713 A | 5/2004 |
| JP | 2006-048110 A | 2/2006 |
| JP | 2006107444 A | 4/2006 |
| JP | 2007511002 | 4/2007 |
| JP | 2007141190 A | 6/2007 |
| JP | 2008-059010 A | 3/2008 |
| JP | 2008123199 | 5/2008 |
| JP | 2009-508237 A | 2/2009 |
| JP | 2010-152801 A | 7/2010 |
| JP | 2010524095 A | 7/2010 |
| JP | 2010170573 | 8/2010 |
| JP | 2014501996 A | 1/2014 |
| KR | 20060046307 A | 5/2006 |
| KR | 20060106640 A | 10/2006 |
| KR | 20070013739 A | 1/2007 |
| KR | 10-2009-0007365 A | 1/2009 |
| KR | 10-2009-0013551 | 2/2009 |
| KR | 1020090017517 | 2/2009 |
| KR | 1020090116591 | 11/2009 |
| KR | 1020100096424 | 9/2010 |
| KR | 10-2011-0139649 | 12/2011 |
| MX | 278251 | 8/2010 |
| RU | 2231117 C2 | 6/2004 |
| RU | 2004117770 A | 5/2005 |
| RU | 2383923 | 3/2010 |
| RU | 2390834 C2 | 5/2010 |
| RU | 2419853 C2 | 5/2011 |
| RU | 2433449 | 10/2011 |
| RU | 2439683 C2 | 1/2012 |
| SG | 117587 A1 | 12/2005 |
| TW | 1416342 | 11/2013 |
| WO | 97/07454 A1 | 2/1997 |
| WO | 0072197 A2 | 11/2000 |
| WO | WO 0146868 A2 | 6/2001 |
| WO | 0203595 A2 | 1/2002 |
| WO | WO 2002/084531 | 10/2002 |
| WO | 2007032907 A1 | 3/2007 |
| WO | WO 2007/061057 | 5/2007 |
| WO | 2010065664 A1 | 6/2010 |
| WO | 2010071630 A1 | 6/2010 |

OTHER PUBLICATIONS

"IWork for iOS—Numbers—Innovative spreadsheets in a few taps", Retrieved on: Apr. 26, 2013, Available at: https://movies.apple.com/ca/apps/iwork/numbers/, 9 pgs.

"International Search Report and Written Opinion Issued for PCT Patent Application No. PCT/US2014/041258", dated Feb. 18, 2015, 10 Pages.

U.S. Appl. No. 10/858,188, filed Jun. 1, 2004 entitled "Method and Apparatus for Viewing and Interacting with a Spreadsheet from within a Web Browser".

Blattner et al, "Special Edition Using Microsoft Excel2000", May 3, 1999, Que, pp. 1-13.

International Search Report and Written Opinion Issued for PCT Patent Application No. PCT/US2014/041258, dated Jun. 12, 2015, 7 Pages.

International Report on Patentability Issued for PCT Patent Application No. PCT/US2014/041258, dated Aug. 31, 2015, 8 Pages.

Andrews et al., "Liquid Diagrams: Information Visualization Gadgets"; Information Visualization (IV), 2010 14th International Conference, IEEE, Jul. 26, 2010; pp. 104-109.

Author Unknown, About Dynamic Data Exchange—Published Date: Sep. 6, 2011, 5 pgs; http://msdn.microsoft.com/en-us/library/windows/desktop/ms648774%28v=vs.85%29.aspx Dynamic Data Exchange Protocol.

Battagin, Dan, Using Excel Web Services in a SharePoint Web Part—Published Date: Nov. 2006 ##, 8 pgs; http://msdn.microsoft.com/en-us/library/aa973804%28v=office.12%29.aspx.

(56) References Cited

OTHER PUBLICATIONS

Blattner, "Special Edition Using Microsoft Excel 2003"; Que, published Sep. 11, 2003, pp. 16, 47-51, 350-369 and 445-447, 30 pgs.
Brain Matter [Online], AlphaBlox, Apr. 5, 2001 [Retrieved on Sep. 7, 2006]. Retrieved from <URL:http://web.archive.org/web/20010405152714/www.blox.com/?id=sheet>.
Brain Matter [Online], AlphaBlox, Jul. 22, 2001 [Retrieved on Sep. 7, 2006]. Retrieved from <URL:http://web.archive.org/web/20010818124342/www.blox.com/products?subsection=spreadhseets>.
Cologo: A Collaborative Web-based Programming Environment, Published on: Sep. 5, 2011, Available at: http://www.cologo-lang.org/docs_starting.html.
Curie, D., "The Medium is the Message: Data Downlink's.xls Lets Number Stay Numbers," Online, Nov.-Dec. 1997, vol. 21, No. 6, p. 64, 66.
"Data Warehouse Trend, Part 2 OLAP is enabled on WWW Browser, formulation/operation of data warehouse becomes easy and enlargement of user target is accelerated"; Nikkei Computer, No. 440, pp. 224-227; Nikkei Business Publications, Inc., Japan, Mar. 30, 1998.
Dodge, et al., Microsoft Office Excel 2003; Official Manual, the first edition, Nikkei BP Soft Press, Inc., Jul. 12, 2004, pp. 129-135 and 387-392.
Dovico™ Software, "Investing in Better Time & Expense Gathering", Jun. 2005, http://www.dovico.com/documents/Investing-in-Better-Time-Expense-Gathering.pdf; 11 pgs.
Entology, "Large Diversified Manufacturer Achieves Sarbanes-Oxley Compliance through Financial Document Management", http://www.entologv.com/Dress/cs/cs_029.htm, 2003, 2 pgs.
Fox, Pamela, How to Convert a Google Spreadsheet into JSON, XML, and MySQL—Published Date: May 17, 2009; 7 pgs; http://blog.pamelafox.org/2009/05/how-to-convert-google-spreadsheet-into.html.
Granet, V., "The Xxl Spreadsheet Project"; Linux Journal, 1999, http://www.;inuxjournal.com/article/3186; downloaded Sep. 21, 2005; 10 pgs.
Google.com; "Getting Started with Spreadsheets Gadgets", accessed Oct. 20, 2011, at: http://code.google.com/apis/spreadsheets/gadgets/; 8 pgs.
"How to: Save a Workbook as a Web Page in Excel 2002; Summary," Retrieved from the Internet: http://support.microsoft.com/default.aspx?scid=kb;en-us;289260, Retrieved on Dec. 12, 2005, 3 pgs.
Hudson, S.E., "User interface specification using an enhanced spreadsheet model," ACM Transactions on Graphics, 1994, 13(3), 209-239.
Huynh, D.; "Timeline Gadget for Google Spreadsheets", Retrieved on: Sep. 20, 2011, Available at: http://s3.amazonaws.com/iac-production/attachments/28/TimeLine_Gadget_for_Google_Spreadsheets.pdf.
Jones, S.P., "A user-centred approach to functions in Excel," JCEP, 2003, 165-176.
Khor, "Microsoft Office Excel 2003 Preview", Jun. 2003, Microsoft Office Excel 2003 Preview, Microsoft Excel 2003 Technical Articles, Microsoft Corporation Publishing.
Levin, Carol, "Skinny Clients to Rule on Web—Corporate Intranets Will Fuel a New Breed of Applications," PC Magazine, Mar. 26, 1996, vol. 15, No. 6, p. 37.
Loney et al., "An Overview of Databases and Instances"; In: Oracle Database 10g DBA Handbook, Mar. 24, 2005; Oracle Press; 2 pgs.
Loney et al., "Dynamic Data Replication"; In: Oracle Database 10g DBA Handbook, Mar. 24, 2005; Oracle Press; 2 pgs.
Loney et al., "Oracle Logical Database Structures"; In: Oracle Database 10g DBA Handbook, Mar. 24, 2005; Oracle Press; 16 pgs.
McManus, Sean, "Excel Everywhere for HTML: Transform Static Excel Spreadsheets Into Smart Interactive Web Pages," Internet Magazine, Mar. 2004, No. 115, p. 106.
Mcpherson; Bruce, Serializing Excel Data for Input to any Google Visualization—Published Date: Jan. 26, 2011; 6 pgs; http://www.eggheadcafe.com/tutorials/excel/571d84dc-9fcf-44de-b2ad-005c12372ab3/serializing-excel-data-for-input-to-any-google-visualization.aspx.
"Object Lens: A Spreadsheet for Cooperative Work; Abstract," by Kum-Yew Lai, et al., Sep. 1988, Retrieved from the Internet: https://hpds1.mit.edu/bitstream/1721.1/2210/1/SWP-2053-21290214.pdf, Retrieved on Dec. 12, 2005, 42 pgs.
Oliver, Andrew C. and Barozzi, Nicola Ken, POI-HSSF and POI-XSSF—Java API to Access Microsoft Excel Format Files—Retrieved Date: Jan. 11, 2012; 2 pgs; http://poi.apache.org/spreadsheet/.
Person, R.; "Creating Charts", Special Edition Using Microsoft Excel '97; © 1997 Que Corp., pp. 385-410.
Powell, Jim, "Add-Ins Turn App Docs Into Web Pages: Microsoft Internet Assistant Tools," Windows Magazine, Jun. 1, 1996, vol. 7, No. 6, p. 120.
Quixa, Builder/Quixa Solutions, http://www.guixa.com/ultimus/builder.asp, 2005, 4 pgs.
Smedley, T.J., et al., "Expanding the utility of spreadsheets through the integration of visual programming and user interface objects," The ACM Digital Library, 1996, 148-155.
Stinson, C.. Microsoft Office Excel 2003, Sep. 3, 2003, Microsoft Press, pp. 1-7.
Truvé, Staffan., "Dynamic what-if analysis: exploring computational dependencies with slidercells and micrographs," Mosaic of Creativity, 1995,280-281.
"Welcome to Gnumeric!" Retrieved from the Internet: http://www.gnome.org/projects/gnumeric/, Retrieved on Dec. 12, 2005, 2 pgs.
WP01:WebSphere MQ Workflow-Performance Estimates and Capacity Assessments, http://www.1.ibm.com/suggort/docview.wss?rs=171 &uid=swg24006573&I0c=enUS&cs=ytu-8&lang=en, 2 pgs.
"XESS The Advanced X Windows Spreadsheet System," Retrieved from the Internet: http://www.ais.com/Xess/xess5_product_sheet.html, Retrieved on Dec. 12, 2005, 3 pgs.
Zhao, Jensen J., "Developing Web-Enabled Interactive Financial Tools Without HTML and Script Languages", In Information Technology, Learning, and Performance Journal, Fall 2001, vol. 19, No. 2, 2001, 5 Pages.
Australian Examination Report dated May 29, 2007, cited in Appln No. SG 200503164-6 dated May 29, 2007, 6 pages.
Australian Examination Report dated Oct. 22, 2009, cited in Appln No. 2006284595 3 pages.
Australian Examination Report dated Oct. 26, 2010 cited in Appln No. 2006291313 2pgs.
Australian Examination Report dated Oct. 29, 2010 cited in Appln No. 2006287357 2 pgs.
Australian Office Action in Application 2012204477, dated Apr. 24, 2016, 3 pgs.
Author Unknown, "Trade Like a Geek—One Click Stock Quotes in Excel—Learn How to Learn Excel"; 2009 Pointy Haired Dilbert—Chandoo.org; 6 pgs. (cited in Sep. 22, 2015 EP ISR).
Author Unknown, "Use Online Data in Excel 2010 Spreadsheets—How to Geek"; Jan. 6, 2012; Retrieved from http://web.archive.org/web/201020106083121/haap://howtogeek.com/howto/24285/use-online-data-in-excel-2010-spreadsheets; 6 pgs. (cited in Sep. 22, 2015 EP ISR).
Author Unknown, Using GoogleFinance to Track Stocks on the Australian Securities Exchange (ASX); Ben's Blog; Sep. 18, 2010; 2 pgs. (cited in Sep. 22, 2015 EP ISR).
Canadian Notice of Allowance dated Apr. 3, 2014 in Appln No. 2,618,224, 2 pgs.
Canadian Office Action dated Dec. 17, 2012 in Appln No. 2,618,211 2 pages.
Canadian Office Action dated May 13, 2013 in Appln No. 2,618,224 4 pages.
Chilean Office Action cited in Appln No. 1155-2005 dated Jan. 16, 2008, 10 pgs.
Chilean Second Office Action cited in Appln No. 1155-2005 dated Jun. 23, 2009, 8 pgs.
Chilean Third Office Action cited in Appln No. 1155-2005 dated Jun. 8, 2010, 11 pgs.
Chinese 1st Office Action in Application 201210044546.8, dated Feb. 24, 2016, 12 pgs.

(56) References Cited

OTHER PUBLICATIONS

Chinese Notice of Grant dated Nov. 27, 2015 in Appln No. 201210012142.0, 4 pgs.
Chinese Office Action and Search Report Issued in Patent Application No. 201210434821.7, dated Oct. 27, 2014, 13 Pages.
Chinese Office Action and Search Report Issued in Patent Application No. 201380007011.6, dated Feb. 3, 2016, 12 Pages.
Chinese Office Action cited in Appln No. 200510075819.5 dated Dec. 14, 2007, 17 pgs.
Chinese Office Action dated Jan. 6, 2014 in Appln No. 201210012142.0, 10 pgs.
Chinese Office Action dated Jul. 24, 2009, cited in Appln No. 200680031441.1 11 pgs.
Chinese Office Action dated May 22, 2009, cited in Appln No. 200680032787.3.
Chinese Second Office Action cited in Appln No. 200510075819.5 dated May 30, 2008, 18 pgs.
Chinese Second Office Action dated Feb. 5, 2010, cited in Appln No. 200680031441.1 7 pgs.
Chinese Second Office Action dated Nov. 13, 2009, cited in Appln No. 200680032787.3 5 pgs.
Chinese Second Office Action Issued in Patent Application No. 201210012142.0, dated Nov. 4, 2014, 6 Pages.
Chinese Second Office Action Issued in Patent Application No. 201210434821.7, dated Jun. 19, 2015, 8 Pages.
Chinese Third Office Action and Search Report Issued in Patent Application No. 201210012142.0, dated May 18, 2015, 13 Pages.
Chinese Third Office Action cited in Appln No. 200510075819.5 dated Nov. 7, 2008, 8 pgs.
Chinese Third Office Action Issued in Patent Application No. 201210434821.7, dated Dec. 17, 2015, 10 Pages.
European Communication in Application 14736166.1, dated Jan. 22, 2016, 2 pgs.
European Extended Search Report dated Jul. 16, 2015 in Appln No. PCT/US2012/063133, 9 pgs.
European Extended Search Report dated Sep. 22, 2015 in Appln No. PCT/US2013/022824, 8 pgs.
European Search Report dated Mar. 6, 2012 in Appl No. 06790149.6, 12 pgs. (also cited by KB as "European Search Report dated Feb. 27, 2012 in Appl No. PCT/US2006/034312".
European Search Report dated Mar. 6, 2012 in Appl No. PCT/US2006/034312; 12 pgs.
India First Examination Report dated Jan. 22, 2014 cited in 1286/DEL/2005, 2 pgs.
India First Examination Report dated Oct. 9, 2015 cited in 1575/DELNP/2008, 3 pgs.
India First Examination Report dated Sep. 30, 2015 cited in 1943/DELNP/2008, 3 pgs.
Indian Exam Report in Application 1981/DELNP/2008, dated Apr. 18, 2016, 7 pgs.
International Search Report dated Jan. 8, 2007, issued in PCT Application No. PCT/US2006/033800; 2 pgs.
International Search Report and Written Opinion for International Application No. PCT/US2012/026672, dated Oct. 25, 2012, 11 pgs.
International Search Report dated Aug. 21, 2007, issued in EP 05104560; 3 pgs.
International Search Report dated Mar. 22, 2013, issued in PCT/US2012/063133 9 pages.
Israeli Office Action cited in Appln No. 168621 dated Sep. 22, 2009, 2 pgs.
Japanese Final Notice of Rejection dated Dec. 7, 2012 in Appln No. 2008-530095 4 pages.
Japanese Notice of Rejection cited in Appln No. 2008-530095 dated Jan. 31, 2012 5 pgs.
Japanese Notice of Rejection dated Apr. 22, 2011 cited in Appln No. 2008-529328 7 pgs.
Japanese Notice of Rejection dated Feb. 3, 2012 cited in Appln No. 2008-530243; 9 pgs.
Japanese Notice of Rejection in Appln No. 2005-161 206 dated Oct. 22, 2010.
Japanese Notice of Rejection Issued in Patent Application No. 2013-548479, dated Jan. 26, 2016, 9 Pages.
Korean Preliminary Rejection dated Jan. 13, 2013 in Appln No. 10-2008-7004303; 13 pgs.
Loney et al., "Overview of Oracle Net"; In: Oracle Database 10g OBA Handbook, Mar. 24, 2005; Oracle Press; 12 pgs. (cited in Feb. 27, 2012 EP Search Report).
Malaysia Modified Substantive Examination Report dated Feb. 13, 2015 in Appln No. PI 20080396, 2 pgs.
Malaysia Substantive Examination Report dated Jan. 15, 2014 in Appln No. PI 20080503, 3 pgs.
Malaysia Substantive Examination Report dated Jul. 15, 2015 in Appln No. PI 20080503, 2 pgs.
Malaysian Modified Substantive Examination Report dated Aug. 15, 2014 in Appln No. PI 20080396 2 pgs.
Malaysian Notice of Allowance dated Jun. 13, 2014 in Appln No. PI 20080500, 2 pgs.
Malaysian Office Action cited in Appln No. PI 20052416, dated Sep. 15, 2010, 3 pgs.
Mexican Second Office Action cited in Appl No. PNa/2005/005855, dated Nov. 18, 2009, 2 pgs.
Mexican Office Action cited in Appl No. MX/a/2008/003318, dated Aug. 17, 2010, 3 pgs.
Mexican Office Action dated Apr. 27, 2012, cited in Appl No. MX/a/2008/003318 3 pages.
Mexican Office Action dated Dec. 8, 2010, cited in Appl No. MX/a/2008/003318; 8 pgs.
Mexican Office Action dated Feb. 11, 2013 in Appln No. MX/a/2008/003309 7 pages.
Mexican Office Action dated Jul. 14, 2010, cited in Appl No. MX/a/2008/002501; 4 pgs.
Mexican Office Action dated May 6, 2013, cited in Appl No. MX/a/2008/003318; 15 pgs.
Mexican Office Action dated Oct. 4, 2011 in Appln No. Mx/a/2008/003309.
New Zealand Examination Report cited in Appln No. 540420 dated Jun. 7, 2005, 2 pgs.
New Zealand Examination Report dated Jan. 20, 2011 cited in Appln No. 566309 2 pages.
New Zealand Examination Report dated May 5, 2011 cited in Appln No. 566309 3 pages.
New Zealand Examination Report dated Sep. 9, 2011 cited in Appln No. 594997 2 pgs.
New Zealand Further Examination Report dated Dec. 14, 2012 cited in Appln No. 594997 2 pgs.
Notice of Allowance dated Feb. 6, 2015, issued in U.S. Appl. No. 13/289,663, 57 pgs.
Notice of Allowance dated Jun. 25, 2015, issued in U.S. Appl. No. 13/570,071, 7 pgs.
Office Action dated Apr. 20, 2012, issued in U.S. Appl. No. 11/860,394, 20 pages.
Office Action dated Apr. 22, 2013, issued in U.S. Appl. No. 11/223,541, 33 pages.
Office Action dated Apr. 23, 2009, issued in U.S. Appl. No. 11/223,180, 18 pages.
Office Action dated Apr. 30, 2012, issued in U.S. Appl. No. 11/223,541; 35 pgs.
Office Action dated Apr. 7, 2009, issued in U.S. Appl. No. 10/858,188, 25 pgs.
Office Action dated Dec. 20, 2013, issued in U.S. Appl. No. 11/223,541, 54 pgs.
Office Action dated Dec. 24, 2014, issued in U.S. Appl. No. 12/986,473, 28 pgs.
Office Action dated Dec. 8, 2010, issued in U.S. Appl. No. 11/860,394, 16 pages.
Office Action dated Feb. 13, 2013, issued in U.S. Appl. No. 13/289,663, 15 pages.
Office Action dated Feb. 20, 2008, issued in U.S. Appl. No. 10/858,188, 19 pgs.
Office Action dated Jan. 20, 2010, issued in U.S. Appl. No. 11/223,541, 14 pages.
Office Action dated Jan. 8, 2008, issued in U.S. Appl. No. 11/214,676, 13 pages.

(56) References Cited

OTHER PUBLICATIONS

Office Action dated Jul. 2, 2008, issued in U.S. Appl. No. 11/214,676, 13 pages.
Office Action dated Jul. 6, 2007, issued in U.S. Appl. No. 10/858,188.
Office Action dated Jul. 7, 2014, issued in U.S. Appl. No. 11/223,541, 26 pgs.
Office Action dated Jun. 1, 2009, issued in U.S. Appl. No. 11/214,676, 12 pages.
Office Action dated Jun. 17, 2011, issued in U.S. Appl. No. 11/860,394, 17 pages.
Office Action dated Jun. 23, 2011, issued in U.S. Appl. No. 11/223,541, 23 pages.
Office Action dated Mar. 2, 2010, issued in U.S. Appl. No. 11/298,380, 12 pages.
Office Action dated Mar. 2, 2011, issued in U.S. Appl. No. 11/223,541, 23 pages.
Office Action dated Mar. 24, 2014, issued in U.S. Appl. No. 13/570,071, 13 pgs.
Office Action dated Mar. 26, 2015 issued in U.S. Appl. No. 13/035,689, 24 pgs.
Office Action dated Mar. 30, 2009, issued in U.S. Appl. No. 11/298,380, 14 pages.
Office Action dated May 15, 2006, issued in U.S. Appl. No. 10/858,188, 19 pgs.
Office Action dated May 22, 2014, issued in U.S. Appl. No. 13/035,689, 60 pgs.
Office Action dated May 26, 2009, issued in U.S. Appl. No. 11/223,541, 13 pages.
Office Action dated May 8, 2014, issued in U.S. Appl. No. 12/986,473, 75 pgs.
Office Action dated Nov. 19, 2008, issued in U.S. Appl. No. 11/223,541, 7 pages.
Office Action dated Nov. 19, 2014, issued in U.S. Appl. No. 13/035,689, 31 pgs.
Office Action dated Nov. 21, 2006, issued in U.S. Appl. No. 10/858,188, 19 pgs.
Office Action dated Nov. 21, 2008, issued in U.S. Appl. No. 11/214,676, 12 pages.
Office Action dated Nov. 26, 2008, issued in U.S. Appl. No. 11/223,180, 15 pages.
Office Action dated Nov. 6, 2013, issued in U.S. Appl. No. 13/289,663, 15 pages.
Office Action dated Nov. 8, 2011, issued in U.S. Appl. No. 11/860,394, 20 pgs.
Office Action dated Oct. 29, 2008, issued in U.S. Appl. No. 10/858,188, 26 pgs.
Office Action dated Oct. 7, 2011, issued in U.S. Appl. No. 11/223,541, 27 pages.
Office Action dated Oct. 8, 2014, issued in U.S. Appl. No. 13/570,071, 14 pgs.
Office Action dated Sep. 1, 2009, issued in U.S. Appl. No. 11/223,180, 16 pages.
Office Action dated Sep. 14, 2009, issued in U.S. Appl. No. 11/298,380, 15 pages.
Office Action dated Sep. 15, 2010, issued in U.S. Appl. No. 11/223,541, 21 pages.
Office Action dated Sep. 23, 2015 issued in U.S. Appl. No. 13/035,689, 38 pgs.
Office Action dated Sep. 24, 2015, issued in U.S. Appl. No. 12/986,473, 26 pgs.
Office Action dated Sep. 25, 2012, issued in U.S. Appl. No. 11/223,541, 35 pages.
PCT Application PCT/US2013/022824, International Search Report dated May 30, 2013, 10 pages.
PCT International Preliminary Report on Patentability Issued in PCT Application No. PCT/US2013/022824, dated Aug. 7, 2014, 6 Pages.
PCT International Search Report dated Jan. 8, 2007, issued in PCT Application No. PCT/US2006/033800; 2 pgs.
PCT Search Report dated Jan. 9, 2007 in Appln No. PCT/US2006/034312 4 pages.
PCT Search Report dated Oct. 25, 2012 in Appln No. PCT/US2012/026672.
Pembudon et al., XHTML 1.0: The Extensible Hypertext Markup Language, A Reformulation of HTML-4.0 in XML 1.0, W3C Working Draft, May 5, 1999, http://www.w3.org/TR/1999/xhtml1-199990505/, 16 pgs.
Russian Office Action cited in Appln No. 2005116667 dated Apr. 24, 2009, 4 pgs.
Russian Office Action dated Dec. 18, 2015 in Appln No. 2013131022 2412-197167, 5 pgs.
Russian Office Action dated Jul. 29, 2010, cited in Appln No. 2008107762 4 pgs.
Russian Office Action dated Sep. 22, 2010, cited in Appln No. 2008108992 5 pgs.
Russian Office Action dated Sep. 6, 2010, cited in Appln No. 2008108999; 5 pgs.
Taiwan Notice of Allowance dated Jul. 30, 2013 in Appln No. 95132059, 3 pgs.
U.S. Appl. No. 14/920,277, filed Oct. 22, 2015 entitled "System and Method for Providing Calculation Web Services for Online Documents".
U.S. Appl. No. 141731,023, filed Jun. 4, 2015 entitled "Interaction Between Web Gadgets and Spreadsheets".
U.S. Appl. No. 12/986,473, Office Action dated Jun. 2, 2016, 16 pgs.
U.S. Appl. No. 14/731,023, Office Action dated Apr. 11, 2015, 7 pgs.
Walkenbach, John.; "Microsoft Office Excel 2007"; Chapters 15, 27, 40; Excel 2007 Bible; Wiley Publishing; 44 pgs. (cited in Sep. 22, 2015 EP ISR).
U.S. Appl. No. 13/035,689, Office Action dated Jul. 1, 2016, 30 pgs.
U.S. Appl. No. 14/731,023, Notice of Allowance dated Jul. 29, 2016, 7 pgs.
European Office Action in Application 06790149.6, dated May 17, 2016, 6 pgs.
Chinese 4th Office Action in Application 201210434821.7, dated Jun. 22, 2016, 13 pgs.
U.S. Appl. No. 14/731,023, Amendment after Allowance filed Aug. 17, 2016, 3 pgs.
U.S. Appl. No. 14/731,023, Notice of Allowance dated Aug. 17, 2016, 2 pgs.
Chinese 2nd Office Action in Application 201210044546.8, dated Aug. 2, 2016, 13 pgs.
Australian Office Action Issued in Australian Patent Application No. 2012204477, dated Aug. 23, 2016, 3 Pages.
Norwegian Office Action and Search Report in Application 20080596, dated Oct. 11, 2016, 5 pgs.
Russian Notice of Allowance in Application 2013131022, dated Jul. 22, 2016, pgs.
U.S. Appl. No. 12/986,473, Office Action dated Sep. 19, 2016, 20 pgs.
U.S. Appl. No. 14/731,023, Notice of Allowance dated Oct. 31, 2016, 2 pgs.
Japanese Office Action in Application 2014-541110, dated Sep. 26, 2016, pgs.
Chinese 2nd Office Action in Application 201380007011.6, dated Nov. 30, 2016, 9 pgs.
U.S. Appl. No. 13/918,871, Office Action dated Jun. 4, 2015, 18 pgs.
U.S. Appl. No. 13/918,871, Office Action dated Dec. 18, 2015, 16 pgs.
U.S. Appl. No. 13/918,871, Office Action dated Oct. 3, 2016, 19 pgs.
PCT International Preliminary Report on Patentability Issued in PCT Application No. PCT/US2014/041071, dated Jul. 22, 2015, 6 Pages.
PCT International Preliminary Report on Patentability Issued in PCT Application No. PCT/US2014/041071, dated Jul. 7, 2015, 6 Pages.
Schnell, Joshua, "Grid: An Upcoming, Modern Approach to Spreadsheets for iOS Devices", Published on: Aug. 20, 2012, Available at: http://www.macgasm.nel/2012/08/20/grid-an-upcoming-modern-approach-to-spreadsheets-for-ios-devices/, 8 pages.

(56) References Cited

OTHER PUBLICATIONS

Lardinois, Frederic, "YC-Backed Grid Reinvents the Spreadsheet for the Tablet Age", Published on: Aug. 8, 2012, Available at: http://techcrunch.com/2012/08/08/grid-launch/, 5 pages.
"LiveCode Grid for Mobile Devices", Retrieved on: Apr. 26, 2013, Available at: http://www.runrevplanel.com/index.php?option=com_content&view=article&id=250&1temid=148, 2 pages.
"Grid", Published on: Jul. 12, 2012, Available at: http://www.infragistics.com/products/windows-forms/grid/, 6 pages.
Ramakrishnan, et al., "XcelLog: A Deductive Spreadsheet System", Published on: Sep. 2007, Available at: http://www.cs.sunysb.edu/~cram/Papers/RRW_KER07/paper.pdf, 15 pages.
PCT International Search Report and Written Opinion for PCT/US2014/041071 dated Sep. 1, 2014, 9 pgs.
U.S. Appl. No. 13/918,904, Office Action dated Apr. 8, 2015, 23 pgs.
U.S. Appl. No. 13/918,904, Office Action dated Nov. 20, 2015, 26 pgs.
U.S. Appl. No. 13/918,904, Advisory Action dated May 5, 2016, 4 pgs.
U.S. Appl. No. 13/918,904, Office Action dated Oct. 6, 2016, 30 pgs.
Smith, et al., "Analyzing (Social Media) Networks with NodeXL", In Proceedings of the 4th International Conference on Communities and Technologies, Jun. 25, 2009, 9 pgs.
Gibbs, Samuel, "Google Spreadsheets Gains Filtering, One More Reason not to Use Excel", Published on: Mar. 24, 2011, Available at: http://downloadsquad.switched.com/2011/03/24/google-spreadsheets-gains-filtering-one-more-reason-not-to-use/, 8 pgs.
PCT International Search Report and Written Opinion Issued in PCT Application No. PCT/US2014/041276, dated Jan. 16, 2015, 17 Pages.
Jelen, Bill, "Microsoft Excel 2010 in Depth", ISBN 9780789744265, published 2010, 11 pgs.
PCT International Preliminary Report on Patentability Issued in PCT Application No. PCT/US2014/041276, dated Dec. 23, 2015, 6 pgs.
European Extended Search Report in Application 14737383.1, dated Dec. 22, 2016, 6 pgs.
Australian Notice of Allowance in Application 2012204477, dated Oct. 24, 2016, 4 pgs.
U.S. Appl. No. 14/920,277, Office Action dated Jan. 6, 2017, 23 pgs.
U.S. Appl. No. 12/986,473, Notice of Allowance dated Apr. 28, 2017, 10 pgs.
U.S. Appl. No. 13/035,689, Office Action dated Apr. 6, 2017, 39 pgs.
Webb, J., "Excel 2003 Programming: A Developer's Notebook", Chapter 6, Explore Security in Depth, copyright Aug. 20, 2004, O'Reilly Media, Inc. pp. 197-241.
Chinese Notice of Allowance in Application 201210044546.8, dated Feb. 6, 2017, 4 pgs.
Chinese Notice of Allowance in Application 201210434821.7, dated Feb. 6, 2017, 4 pgs.
Japanese Notice of Allowance in Application 2014-541110, dated Apr. 3, 2017, 3 pgs. (No English Translation yet).
Chinese 3rd Office Action in Application 201380007011.6, dated Apr. 1, 2017, 10 pgs.
U.S. Appl. No. 13/918,871, Office Action dated Jun. 16, 2017, 23 pgs.
U.S. Appl. No. 13/918,904, Office Action dated May 26, 2017, 32 pgs.
"Office Action Issued in Mexican Patent Application No. MX/a/2015/017360", dated Jul. 4, 2017, 5 Pages.
U.S. Appl. No. 14/920,277, Office Action dated Jul. 26, 2017, 16 pgs.
European Office Action in Application 14736150.5, dated Aug. 2, 2017, 7 pages.
Anonymous: "Selecting non-blank cells in Excel with VBA—Stack Overflow", May 1, 2009 (May 1, 2009), XP55391820, Retrieved from the Internet: URL: https://stackoverflow.com/questions/821364/selecting-non-blank-cells-in-excel-with-vba [retrieved on Jul. 18, 2017], 3 pages.
Anonymous: "Select Non Empty Cells", Oct. 1, 2009 (Oct. 1, 2009), XP55391822, Retrieved from the Internet: URL: http://www.ozgrid.com/forum/showthread.php?t=141201, [retrieved on Jul. 18, 2017), 5 pages.
European Supplementary Search Report in Application 0681483.3, dated May 26, 2017, 10 pages.
Chinese 4th Office Action in Application 201380007011.6, dated Jul. 4, 2017, 10 pages.
"Put an Excel Snapshot into Work", Retrieved from: <<https://www.journalofaccountancy.com/issues/2003/apr/putanexcelsnapshotintoword.html>>, Apr. 1, 2003, 1 Page.
"Office Action Issued in European Patent Application No. 05104560.7", dated Feb. 25, 2008, 6 Pages.
Hong, Wu, "Excel Essential Toolbox: Fun for Only a Three-Month Mortgage", Retrieved from: <<http://article.pchome.net/content-1047708-all.html>>, Jan. 25, 2010, 9 Pages.
"Supplementary Search Report Issued in European Patent Application No. 06790082.9", dated Dec. 1, 2017, 9 Pages.
"Office Action Issued in European Patent Application No. 06790149.6", dated Jun. 6, 2018, 6 Pages.
"Office Action Issued in Korean Patent Application No. 10-2008-7003836", dated Aug. 21, 2012, 6 Pages.
"Office Action Issued in Korean Patent Application No. 10-2013-7017694", dated Apr. 30, 2018, 11 Pages.
"Office Action Issued in European Patent Application No. 13761403.8", dated Mar. 20, 2017, 6 Pages.
"Search Report Issued in European Patent Application No. 13761403.8", dated Nov. 16, 2015, 7 Pages.
"Non Final Office Action Issued in U.S. Appl. No. 14/920,277", dated May 16, 2018, 22 Pages.
"Office Action Issued in European Patent Application No. 14737383.1", dated May 24, 2018, 5 Pages.
"Office Action Issued in Canadian Patent Application No. 2,616,563", dated Sep. 13, 2013, 2 Pages.
"Office Action Issued in Russian Patent Application No. 2008108999", dated Jun. 29, 2010, 4 Pages.
"First Office Action Issued in Chinese Patent Application No. 201380014464.1", dated Aug. 3, 2016, 12 Pages.
"Second Office Action Issued in Chinese Patent Application No. 201380014464.1", dated Apr. 14, 2017, 14 Pages.
"Second Office Action Issued in Chinese Patent Application No. 201480045249.2", dated Jul. 23, 2018, 5 Pages.
"Office Action and Search Report Issued in Russian Patent Application No. 2015153382", dated Apr. 9, 2018, 8 Pages.
"Office Action Issued in Japanese Patent Application No. 2016-519558", dated May 9, 2018, 7 Pages.
Schlatter, et al., "The Business Object Management System", In IBM Systems Journal, vol. 33, Issue 2, 1994, pp. 239-263.
"Office Action Issued in Mexican Patent Application No. MX/a/2008/003318", dated Dec. 15, 2011, 5 Pages. (W/o English Translation).
"Office Action Issued in Mexican Patent Application No. MX/a/2015/017360", dated Feb. 26, 2018, 8 Pages. (W/o English Translation).
"Office Action Issued in Mexican Patent Application No. MX/a/2016/013976", dated Feb. 20, 2018, 4 Pages.
"Office Action Issued in Mexican Patent Application No. MX/a/2016/013976", dated Jun. 5, 2017, 4 Pages. (W/o English Translation).
"Office Action Issued in Mexican Patent Application No. PA-a-2005-005855", dated Apr. 21, 2009, 5 Pages.
"International Search Report and Written Opinion Issued in PCT Application No. PCT/US2013/027547", dated Jun. 27, 2013, 10 Pages.
"Office Action Issued in Malaysian Patent Application No. PI 200800396", dated Jun. 28, 2013, 3 Pages.
"Office Action Issued in Malaysian Patent Application No. PI 20080500", dated Jul. 31, 2012, 3 Pages.
"Office Action Issued Brazilian Patent Application No. PI0615023-3", dated Apr. 2, 2018, 6 Pages.

(56) References Cited

OTHER PUBLICATIONS

Mexican Office Action in Application MX/a/2015/017360, dated Jun. 26, 2017, 5 pages.
PCT International Search Report & Written Opinion Issued in PCT Application No. PCT/US2012/020192, dated Jul. 31, 2012, 8 Pages.
Japanese Notice of Allowance Issued in Japanese Patent Application No. 2013-548479, dated Jul. 4, 2016, 4 Pages.
Chinese First Office Action and Search Report Issued in Chinese Patent Application No. 201480045249.2, dated Nov. 29, 2017,15 Pages.
Chinese Notice of Allowance in Application 201380007011.6, dated Nov. 7, 2017, 4 pages.
Canadian Notice of Allowance in Application 2822066, dated Nov. 23, 2017, 1 page.
U.S. Appl. No. 13/918,904, Office Action dated Jan. 5, 2018, 30 pgs.
European Search Report Issued in Patent Application No. 12732029.9, dated Dec. 19, 2017, 13 Pages.
Shimpi, et al., "Apple's iPad—The AnandTech Review—AnandTech Your Source for Hardware Analysis and News", Retrieved From <<https://www.anandtech.com/show/3640/apples-ipad-the-anandtech-review/4>>, Apr. 7, 2010, 6 Pages.
Socubeliveg, et al., "Apple iPad Numbers Tutorial—how to use Numbers on ipad", Retrieved From <<https://www.youtube.com/watch?v=p0aOZWK12fM>>, Aug. 31, 2010, 1 Page.
PCT International Search Report, dated Jun. 27, 2013, Application No. PCT/US2013/027547, Filed Date: Feb. 25, 2013, pp. 10.
"Touch", Retrieved at <<http://msdn.microsoft.com/en-us/library/windows/desktop/cc872774.aspx>>, Retrieved Date: Feb. 1, 2012, pp. 18.
Office Action received for U.S. Appl. No. 12/887,003, dated Apr. 4, 2014, 25 pages.
U.S. Appl. No. 13/418,489, Office Action dated Feb. 13, 2014, 12 pages.
U.S. Appl. No. 13/418,489, Office Action dated Aug. 27, 2014, 16 pages.
U.S. Appl. No. 13/418,489, Notice of Allowance dated Dec. 9, 2014, 10 pages.
First Office Action and Search Report Issued in related Chinese Patent Application No. 201480045299.0, dated Mar. 8, 2018, 11 Pages.
Chinese Office Action and Search Report Issued in Chinese Application No. 201480045377.7, dated Feb. 13, 2018, 14 Pages.
U.S. Appl. No. 13/918,871, Office Action dated Apr. 5, 2018, 28 pgs.
European Office Action Issued in European Patent Application No. 14736150.5, dated Mar. 15, 2018, 5 Pages.
"Office Action Issued in Australian Patent Application No. 2014278514", dated Feb. 12, 2019, 3 Pages.
"Office Action Issued in Mexico Patent Application No. MX/a/2015/017360", dated Nov. 5, 2018, 12 Pages.
"Office Action Issued in Mexico Patent Application No. MX/a/2016/013976", dated Nov. 5, 2018, 16 Pages.
"Non-Final Office Action Issued in U.S. Appl. No. 13/918,871", dated Apr. 4, 2019, 35 Pages.
"Non-Final Office Action Issued in U.S. Appl. No. 15/637,788", dated Mar. 21, 2019,13 Pages.
"Final Office Action Issued in U.S. Appl. No. 13/918,904", dated Sep. 5, 2018, 28 Pages.
"Use Slicers to Filter Data", Retrieved from: https://support.office.com/en-us/article/use-slicers-to-filter-data-249f966b-a9d5-4b0f-b31a-12651785d29d, Jan. 2018, 3 Pages.
"Second Office Action Issued in Chinese Patent Application No. 201480045299.0", dated Nov. 23, 2018, 10 Pages.
"Final Office Action Issued in U.S. Appl. No. 13/918,871", dated Nov. 1, 2018, 33 Pages.
"Complete Illustration of Mini Excel 2007 Graph", Published by Exmedia Ltd., Sep. 2, 2007, 1 Page.
Takei, Kazumi, "Gmail & Google Document~ Show you all you need to know", Published by Shoeisha Co., Ltd., 1st Edition, Oct. 3, 2011, 1 Page.
"Notice of Allowance Issued in Chinese Application No. 201480045377.7", dated Oct. 26, 2018, 8 Pages.
"Notice of Allowance Issued in Japanese Patent Application No. 2016519558", dated Nov. 1, 2018, 6 Pages.
"Summons to Attend Oral Proceedings Issued in European Patent Application No. 14737383.1", dated Apr. 15, 2019, 5 Pages.
Omura, Atsushi, "Protect Method—Protecting Sheets, Introduction to VBA Programing for Excel Users", In Nikkei Business Publications Inc, Jan. 1, 2001, pp. 67-68.
"Office Action Issued in Australian Patent Application No. 2014278514", dated May 23, 2019, 3 Pages.
"Office Action Issued in Chinese Patent Application No. 201480045299.0", dated May 27, 2019, 8 Pages.
"Office Action Issued in European Patent Application No. 13741052.8", dated Jul. 1, 2019, 6 Pages.
"Office Action Issued in European Patent Application No. 14736166.1", dated Jul. 1, 2019, 10 Pages.
"Office Action Issued in Korean Patent Application No. 10-2014-7025384", dated Jul. 22, 2019, 5 Pages.
"Office Acton Issued in European Patent Application No. 12732029.9", dated Jul. 26, 2019, 7 Pages.
"Final Office Action Issued in U.S. Appl. No. 15/637,788", dated Oct. 3, 2019, 18 Pages.
"Office Action Issued in Mexican Patent Application No. MX/a/2015/017360", dated Jul. 16, 2019, 8 Pages.
"Final Office Action Issued in U.S. Appl. No. 13/918,871", dated Oct. 28, 2019, 49 Pages.
"Office Action Issued in Indian Patent Application No. 4834/CHENP/2013", dated Nov. 6, 2019, 10 Pages.
"Notice of Allowance Issued in Korean Patent Application No. 1020147025384", dated Jan. 6, 2020, 5 Pages.
"Remote Control for Zoomable UI on TV", In Prior Art Database Technical Disclosure, IPCOM000159392D, Oct. 29, 2007, 6 Pages.
"Notice of Allowance Issued in U.S. Appl. No. 15/637,788", dated Feb. 18, 2020, 10 Pages.
Kelly, et al., "Visualization Exploration and Encapsulation via a Spreadsheet-like Interface", In Journal of IEEE Transactions on Visualization and Computer Graphics, vol. 7, Issue 3, Jul. 2001, pp. 275-287.
"Office Action and Search Report Issued in Chinese Patent Application No. 201710255434.X", dated Feb. 3, 2020, 9 Pages.
"Office Action Issued in Brazil Patent Application No. BR112015031195.4", dated Feb. 18, 2020, 5 Pages.

\* cited by examiner

FIG. 2B

|  | A | B | C |
|---|---|---|---|
|  |  | Data 235 | 245 |
|  |  | ORDERS | SALES |
| 2 | Q3 | 32 | 6,350 |
| 3 | 22 | 47 | 8,210 |
| 4 | 14 | | |

Sheet 1 — 250
Sheet 2 — 255

Tabs: File | Home | Insert | Page Layout | Formulas | Data | Review | View | Structured Refs 205 (window)
210
215
216
230
246
247

Book 1

FIG. 3B

SEAMLESS GRID AND CANVAS INTEGRATION IN A SPREADSHEET APPLICATION

BACKGROUND OF THE INVENTION

With the advent of spreadsheet applications, computer and computer software users have become accustomed to processing and manipulating enormous amounts of data and using spreadsheet functions to perform many simple to very complex calculations and organizational functions with their data. Typical spreadsheet solutions provide a grid made up of rows, columns and dividers for receiving and manipulating data. The structure of a spreadsheet grid provides easy layout in a visual way and makes it easy to change entire rows or columns of information by simply inserting, resizing and deleting rows or columns. Such a grid-structured spreadsheet also allows a simple way to reference other cells in the grid by allowing users to build complex solutions utilizing data and calculations. These calculations maintain integrity (i.e., adjust to changes) when new columns are inserted, content is cut/copied/pasted, and the like, and such grid-structured spreadsheets make this type of data manipulation easier to implement and understand.

In some cases, various pieces of data, data objects, and the like included in a spreadsheet document may be copied from the grid-structured spreadsheet for use in another spreadsheet or another document of a different type. Such cases occur where users feel overwhelmed by large seemingly endless spreadsheet grids and desire to move part of their data or various data objects (for example, tables, charts, summaries, and the like) to a different document type without the underlying row/column grid-structure of the spreadsheet to present the data in a way that is more professional, visually engaging, or easier to read and/or interpret.

Unfortunately, extracting data objects from a grid-structured spreadsheet for use with other spreadsheets or other documents of different types presents various drawbacks. First, present solutions do not allow a user to efficiently move data or data objects to and from one structure to another and, when moved, only the values but not any underlying formulas are retained. Second, such solutions can develop error situations when extracted data or data objects are subsequently manipulated outside of the originating spreadsheet. For example, if the user attempts to copy data or a data object that has been modified back into the grid-structured spreadsheet from which it came, similar error situations may occur. A way of allowing a user to pull data or data objects out of grid-structured spreadsheet and place them in an unstructured canvas where the pulled data objects may be freely arranged would be an improvement providing a technical advantage over the current state of the art because it would give the user the ability to present the data in a way that is more professional, visually engaging, or easier to read and/or interpret while retaining all of the sophisticated computational functionality of the spreadsheet application.

It is with respect to these and other considerations that the present invention has been made.

SUMMARY OF THE INVENTION

This summary is provided to introduce a selection of concepts in a simplified form that are further described below in the detailed description. This summary is not intended to identify key features or essential features of the claimed subject matter, nor is it intended as an aid in determining the scope of the claimed subject matter.

Embodiments of the present invention solve the above and other problems by providing seamless grid and canvas integration in a spreadsheet application. According to embodiments, one or more data objects may be pulled from a grid-structured spreadsheet application document and may be allowed to "float" on the grid-structured spreadsheet without regard to the underlying grid. References between data and computations in the floating data object are structured and maintained so that the floating object may be manipulated and increased/decreased without adversely affecting the underlying grid and such that both data and computational references between the floating data object and the underlying grid are maintained. If desired, the floating object may be pushed or inserted back into the grid at any location, and the references between data in the grid and data in the floating (now re-inserted) object are maintained regardless of the insertion point.

According to another embodiment, such a data object may be seamlessly placed on to a grid-less canvas-like user interface and from the canvas-like user interface back to a grid-structured spreadsheet without upsetting connections (data and computational) between the data object and the associated grid-structured spreadsheet from which the data object was pulled or extracted. That is, according to embodiments of the present invention, moving spreadsheet objects between a canvas-like user interface structure in a spreadsheet application and one or more "sheets" in a spreadsheet application document are seamlessly enabled while maintaining references and computational functions associated with data in the moved objects. In addition, an ability to disconnect spreadsheet objects from global calculations contained in an underlying grid-structured spreadsheet is enabled when using such objects on a spreadsheet canvas, floating such objects on a grid-structured spreadsheet, or pulling such objects from and inserting such objects back into a spreadsheet.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

FIG. 2B illustrates depositing the data object of FIG. 2A onto a grid-structured spreadsheet document for floating the data object on the spreadsheet document.

FIG. 3B illustrates inserting or pushing the data object of FIG. 3A into a grid-structured spreadsheet document.

DETAILED DESCRIPTION

Figure 1:
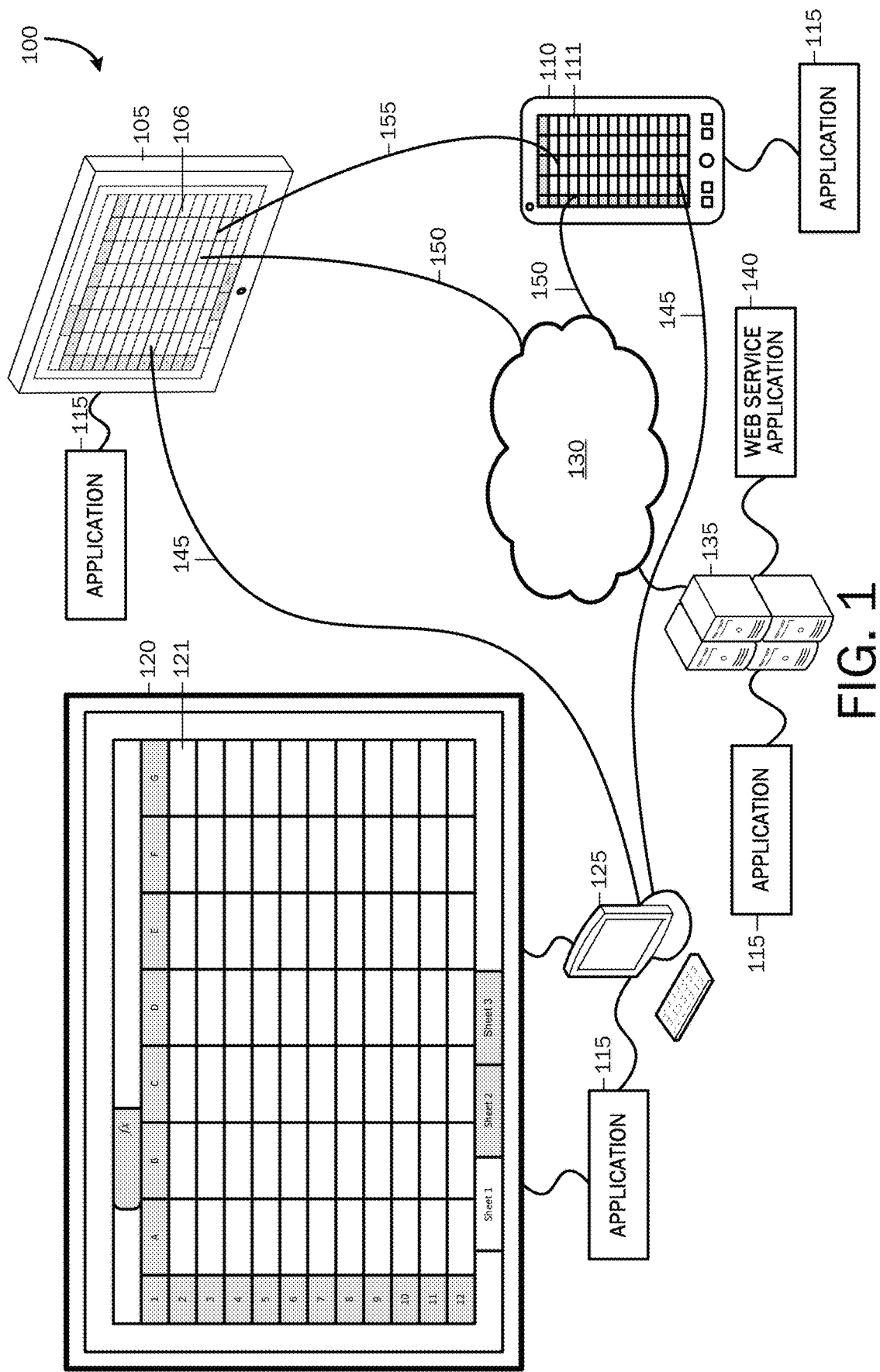
FIG. 1 illustrates a system architecture in which embodiments of the present invention may be practiced.

As briefly described above, embodiments of the present invention are directed to seamless grid and canvas integration and spreadsheet application. The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described may be modified by substituting, reordering, or adding stages to the disclosed methods. Accordingly, the following detailed description does not limit the invention but, instead, the proper scope of the invention is defined by the appended claims.

FIG. 1 illustrates a system architecture in which embodiments of the present invention may be practiced. In FIG. 1, a variety of computing devices are illustrated with which embodiments of the present invention may be practiced on individual computing devices or in a collaborative work session. For example, a small-form smartphone or other handheld computing device 110 is illustrated having a display surface 111 and being associated with a spreadsheet application 115. A larger form tablet-style computing device 105 having a display surface 106 and an associated spreadsheet application 115 is illustrated. A large display device 120 having a display surface 121 is illustrated being associated with a computer 125 and a spreadsheet application 115.

As should be appreciated, the computing devices 105, 110, 120, 125 are purposes of illustration only and are not exhaustive of the various types of computing devices that may be used in accordance with embodiments of the present invention. For example, while the display device 120 is illustrated as a display unit with an associated computing device 125, the large-form display device 120 may operate as an integrated display/computing device that may be used for any suitable use from large-scale display uses, for example, in a conference room, to personal computing, as desired. According to embodiments, each of the computing devices illustrated in FIG. 1 may receive input through a variety of suitable means including touch or gesture input, keyboard input, mouse input, voice command input, electronic inking input, and the like.

Referring still to FIG. 1, the software applications 115 illustrated in association with each of the computing devices 105, 110, 120, 125 are illustrative of any of a spreadsheet application having sufficient computer executable instructions for enabling embodiments of the present invention as described herein. An example spreadsheet application 115 includes EXCEL manufactured by Microsoft Corporation of Redmond, Wash. As should be appreciated, this is but one example spreadsheet application 115, and any other application suitable for enabling embodiments described herein may be used.

Each of the computing devices 105, 110, 120, 125 may operate in a collaborative work environment through one or more wired or wireless data connections 145, 150, 155. That is, each of the computing devices may communicate with each other through wired or wireless data lines via direct connection, or via connection through a distributed computing network 130 such as an Internet or intranet.

According to embodiments, application functionality associated with each of the computing devices 105, 110, 120, 125 may operate according to one or more variations. For example, each application 115 may be a fully functional "thick" client application having all application functionality including the ability to send and receive data to and from other applications 115 operating on other computing devices in the collaborative work session. Each such application not only has its native functionality, for example, spreadsheet functionality, but according to embodiments of the present invention, each such application also contains sufficient computer executable instructions for allowing each application to operate as a control application for controlling information sent from a control device for receipt by an endpoint display device in a collaborative work environment. Likewise, each such application has sufficient computer executable instructions for allowing the application to operate as an endpoint display device for receiving control functions from another computing device.

According to another embodiment, the computing devices 105, 110, 120, 125 may communicate via a distributed computing network 130, for example, the Internet. Referring still to FIG. 1, the computing device 135 is illustrative of an Internet-based or "cloud-based" server computer on which may be operated one or more web services applications 140 for providing a collaborative work session, as described herein. According to this embodiment, each of the devices 105, 110, 120, 125 may operate as thin client systems, and collaborative communication between the devices may be operated at the direction of the web services application 140 operated at a remote site. According to this embodiment, a spreadsheet application 115 may operate at the remote server 135 wherein each of the devices 105, 110, 120, 125 may access and receive the functionality described herein via a remote service from the server based application 115, for example, via the web services application 140.

FIG. 2A, 2B, 3A, 3B, 4A, 4B, 5A, 5B described below show example spreadsheet application user interfaces with which data may be utilized, as described herein. As should be appreciated, the example user interfaces described below may be displayed on any suitable computing device 105, 110, 120,125 described above with reference to FIG. 1. In addition, as should be appreciated, user interaction with the described user interfaces may be performed according to any suitable interaction means, including touch interaction, gesture interaction, keyboard interaction, mouse interaction, voice command interaction, or a combinations thereof.

Figure 2A:
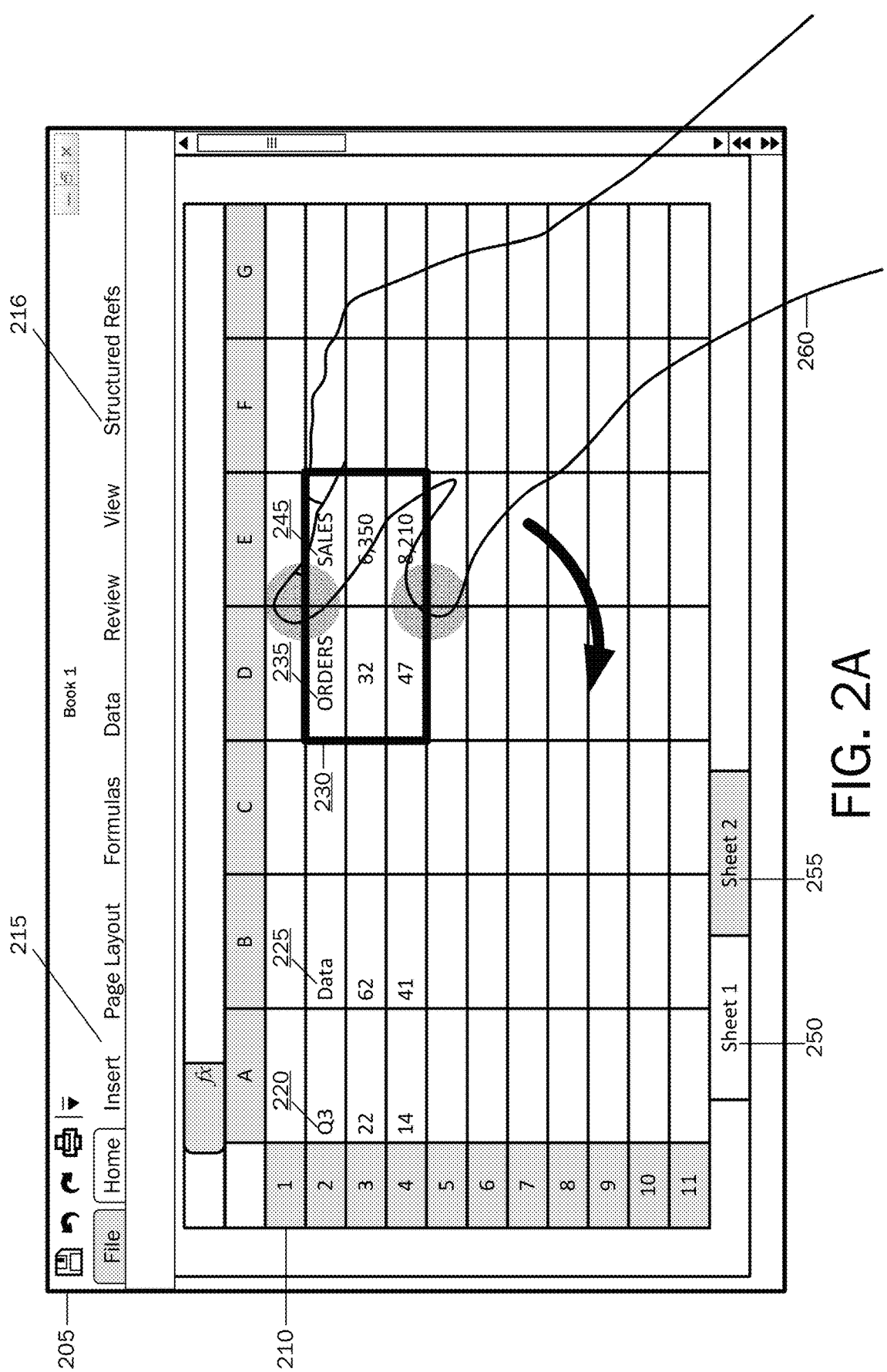
FIG. 2A illustrates pulling or moving a data object from a grid-structured spreadsheet document for floating the pulled data object on to the spreadsheet document from which it was pulled.

FIG. 2A illustrates pulling or moving a data object from a grid-structured spreadsheet document for floating the pulled data object on to the spreadsheet document from which it was pulled. A spreadsheet application user interface 205 is illustrated having a variety of application functionality buttons and/or controls 215, 216 for providing functionality in association with the grid-structured spreadsheet document 210 and one or more data objects 220, 225, 230, 235, 245 entered therein by one or more users. A "Sheet 1" indicator 250 and a "Sheet 2" indicator 255 are illustrative of indicators showing that the example spreadsheet application document is comprised of two sheets of grid-structured data. The grid-structured sheets comprised of various rows and columns which combine to form an array of cells is well known to those skilled in the art and is illustrative of a user interface layout for receiving data of various types and for organizing, manipulating, and performing various computational functions on data according to any suitable spreadsheet application 115 described above with reference to FIG. 1.

According to embodiments of the present invention, one or more data objects, including data objects, for example, tables, charts, pivot tables, cells, ranges of cells, named ranges of cells, pivot charts, and the like may be pulled, copied or moved from a spreadsheet document (e.g., sheet) and may be deposited onto the same or another spreadsheet document such that the data objects "float" on top of the grid-structured spreadsheet document. That is, as illustrated in FIG. 2A, a user 260 using a pinching-style touch gesture may pull the data object 230 (e.g., data table) from the grid-structured spreadsheet 210 to allow the pulled data object to float on top of the grid-structured spreadsheet document 210, as illustrated in FIG. 2B.

While the pulling of the data object 230 is illustrated as a touch gesture (e.g., pinching and pulling) user interaction, any other appropriate function for pulling and moving the data, for example, cut and paste, drag and drop, and the like may be utilized for pulling and moving a data object from the grid-structured spreadsheet 210 and for floating the data object on to the grid-structured spreadsheet 210, or for pushing the data object back into a grid-structured spreadsheet 210, or placing the data object onto a spreadsheet canvas, as described below.

Referring to FIG. 2B, the now floating data object 230 (e.g., data table) may be moved about on the surface of the grid-structured spreadsheet 210 as desired by the user. For example, as illustrated in FIG. 2B, the floating data object 230 is partially covering column B in the spreadsheet 210 such that part of the data entered into column B, rows 3 and 4 is covered by the floating data object 230. As should be appreciated, according to embodiments of the present invention, the user may move the floating data object 230 around the grid-structured spreadsheet as desired. For example, if the object 230 previously was positioned in the spreadsheet at a considerable distance from column A such that the user was not able to view the data contained in column A and the data contained in the table data object 230 simultaneously owing to a lack of sufficient display space on the user's computing device 105, 110, 120,125 then according to embodiments of the present invention, the user may pull the table data object 230 from the grid-structured spreadsheet 210 to allow the table data object 230 to float on top of the spreadsheet, followed by moving the floating table object to a position, as illustrated in FIG. 2B, where the user may visualize the data contained in column A and contained in the floating table object simultaneously. Thus, the user has immediately overcome the space limitations placed on the user by the size of his/her display screen so that the user may readily and efficiently view the desired column of data and the floating data table side-by-side. As should be appreciated, this is but one example of the benefits of enabling the floating of a given data object on the grid-structured spreadsheet, as desired.

A floating data object may be authored, edited, or updated (e.g., have formulas adjusted or have data/images/etc. changed) just as if it were still in a fixed position in the grid-structured spreadsheet. For example, the floating data object may be edited directly by the user, updated when the spreadsheet recalculates, updated in response to changes made in other places in spreadsheet by the user, or other events that impact the data object. In other words, the floating data object remains connected to the data/computational model of the spreadsheet.

As should be appreciated, the illustration of a floating table data object 230 is for purposes of example only. As described above, any data object, for example, a cell, a range of cells, a chart, a pivot table, and the like may be pulled from the grid-structured spreadsheet and may be floated on top of the grid-structured spreadsheet followed by moving the floating object around on the spreadsheet for the benefit of the user 260.

Figure 3A:
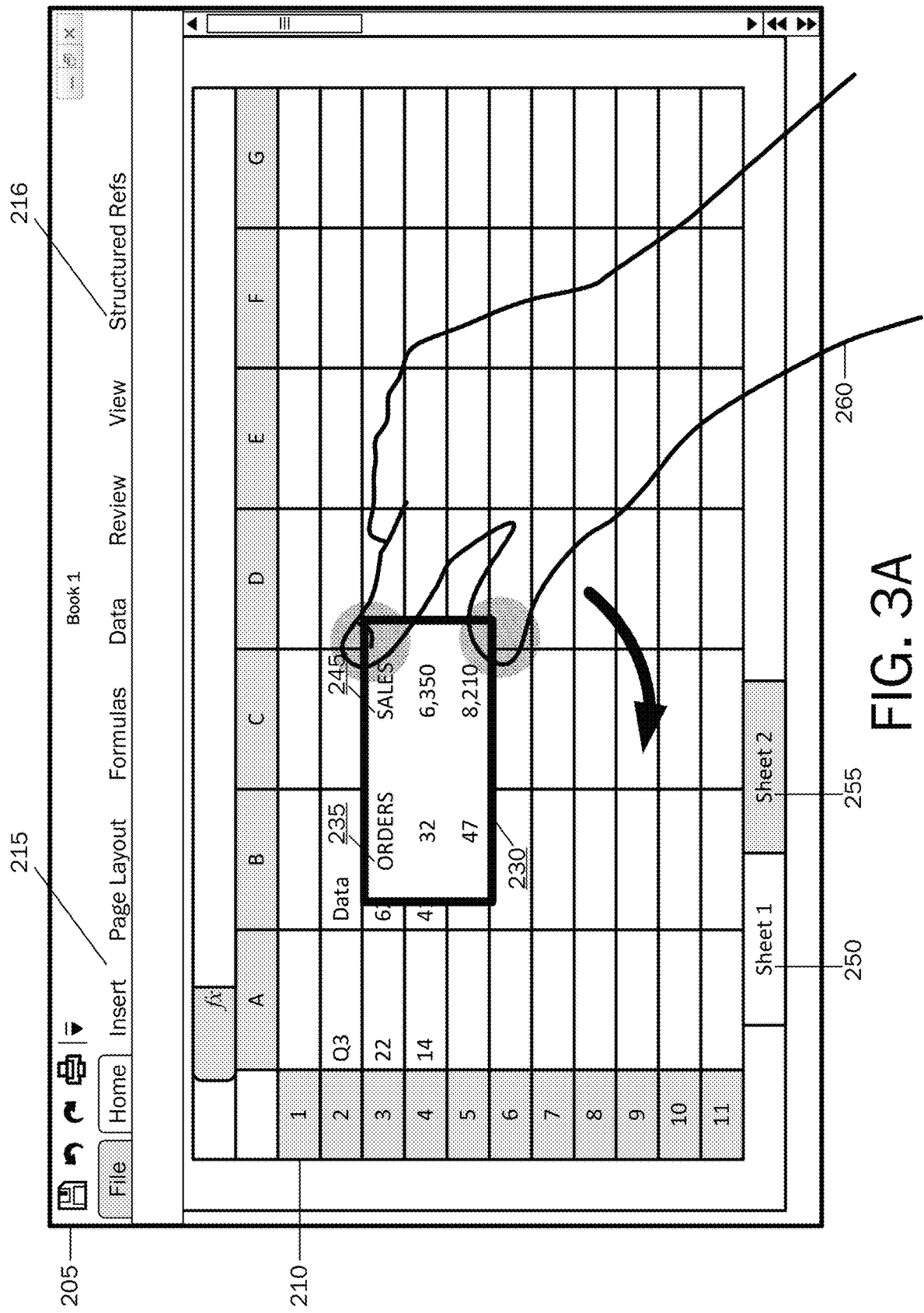
FIG. 3A illustrates pulling or moving the data object of FIG. 2B for inserting or pushing the data object into a grid-structured spreadsheet document.
Figure 3B:
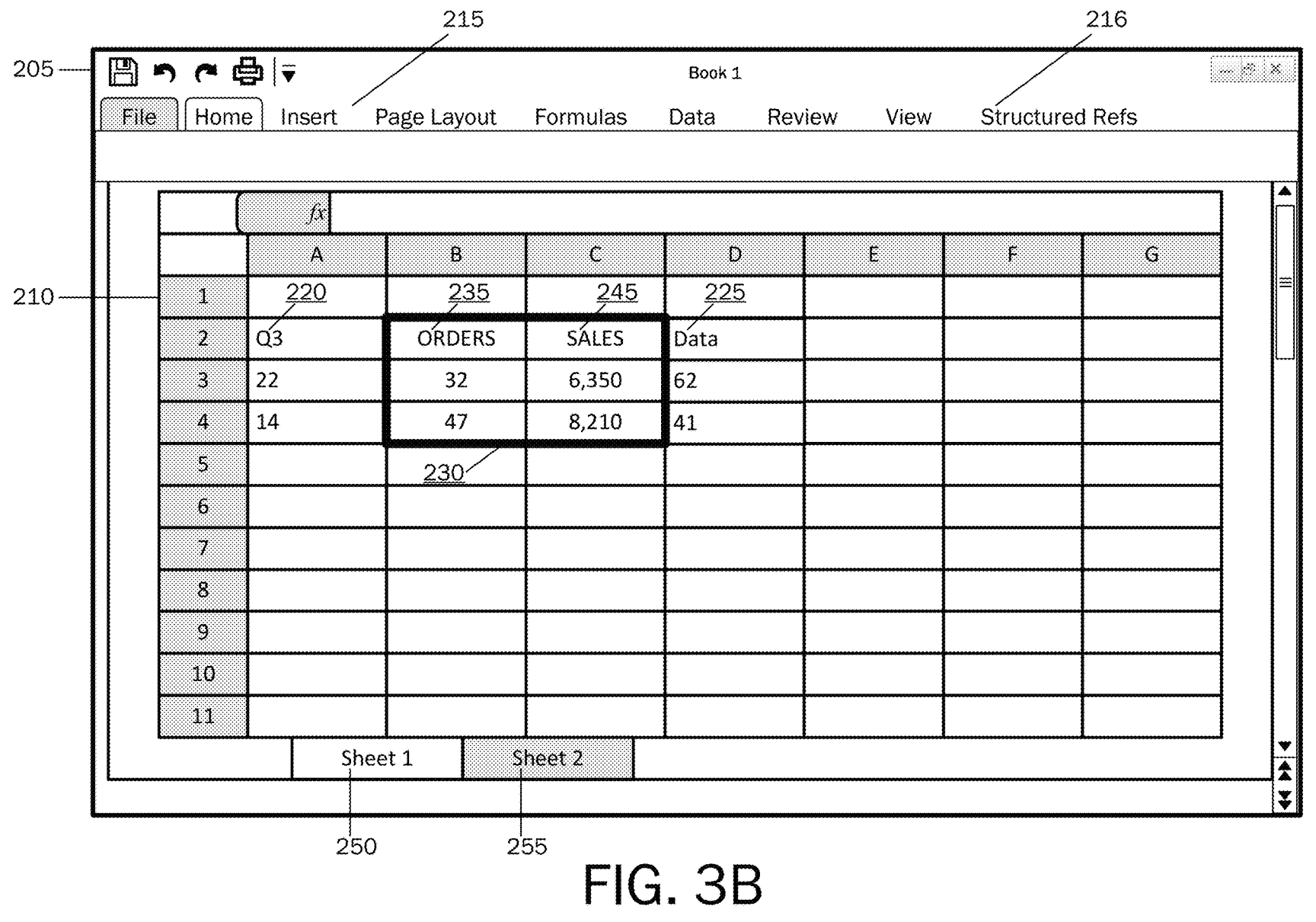

Referring now to FIG. 3A, according to embodiments of the present invention, a floating data object 230 may be pushed back into the grid-structured spreadsheet 210 at any position such that the re-inserted data object may once again be part of the spreadsheet 210 so that the re-inserted data object 230 moves with and adjusts with and is otherwise associated with the structure of the spreadsheet 210 in terms of positioning in appropriate rows and columns in the spreadsheet 210 in which it is inserted. As illustrated in FIG. 3B, the data object 230 that is pushed into the grid-structured spreadsheet 210 does not have to be pushed or re-inserted into the spreadsheet 210 in the same location from which it was originally removed. Referring back to FIG. 2A, the data object 230 was originally positioned at columns D and E, rows 2, 3, and 4, but as illustrated in FIG. 3B, the data object 230 has been re-inserted into the spreadsheet 210 at a different position at columns B and C, rows 2, 3, and 4.

Moreover, the data object 230 need not only be re-inserted back into the spreadsheet 210 from which it came, but instead the floating data object 230 may be pushed into the a different sheet of the present spreadsheet application document (e.g., spreadsheet workbook), or the floating data object 230 may be pushed into a sheet of a different spreadsheet application document (e.g., workbook) altogether. In addition, it is not required that the sequence go from pulling the data object from one spreadsheet, floating the data object onto the same or different sheet, followed by pushing or inserting the floating data object 230 into the same or other different sheet. According to embodiments, a user may pull a data object directly from one sheet and immediately insert the data object to a different location in the same sheet or to a desired location in a different sheet.

Figure 4A:
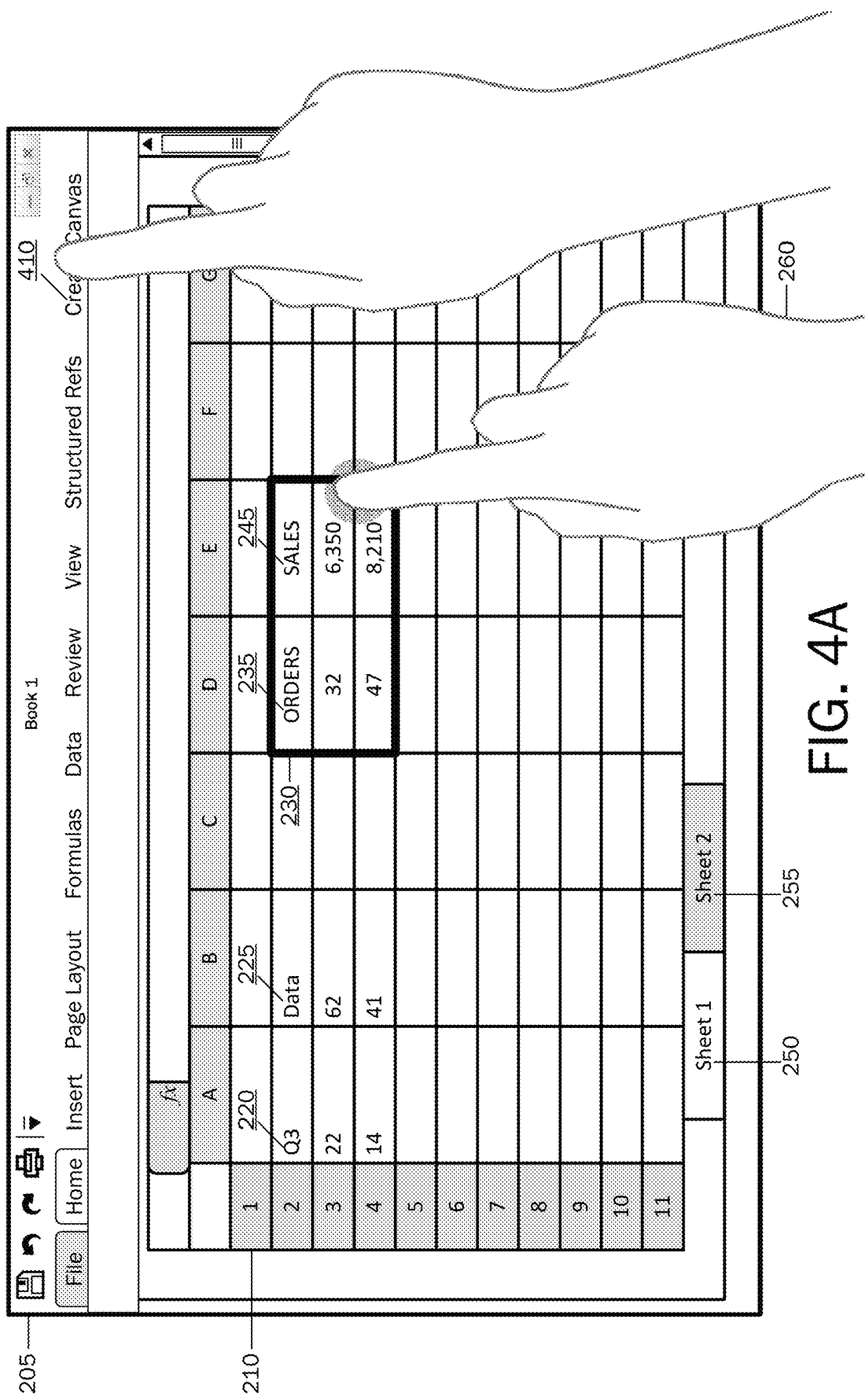
FIG. 4A illustrates pulling or moving a data object from a grid-structured spreadsheet document for depositing the pulled or moved data object onto a canvas-like user interface.
Figure 4B:
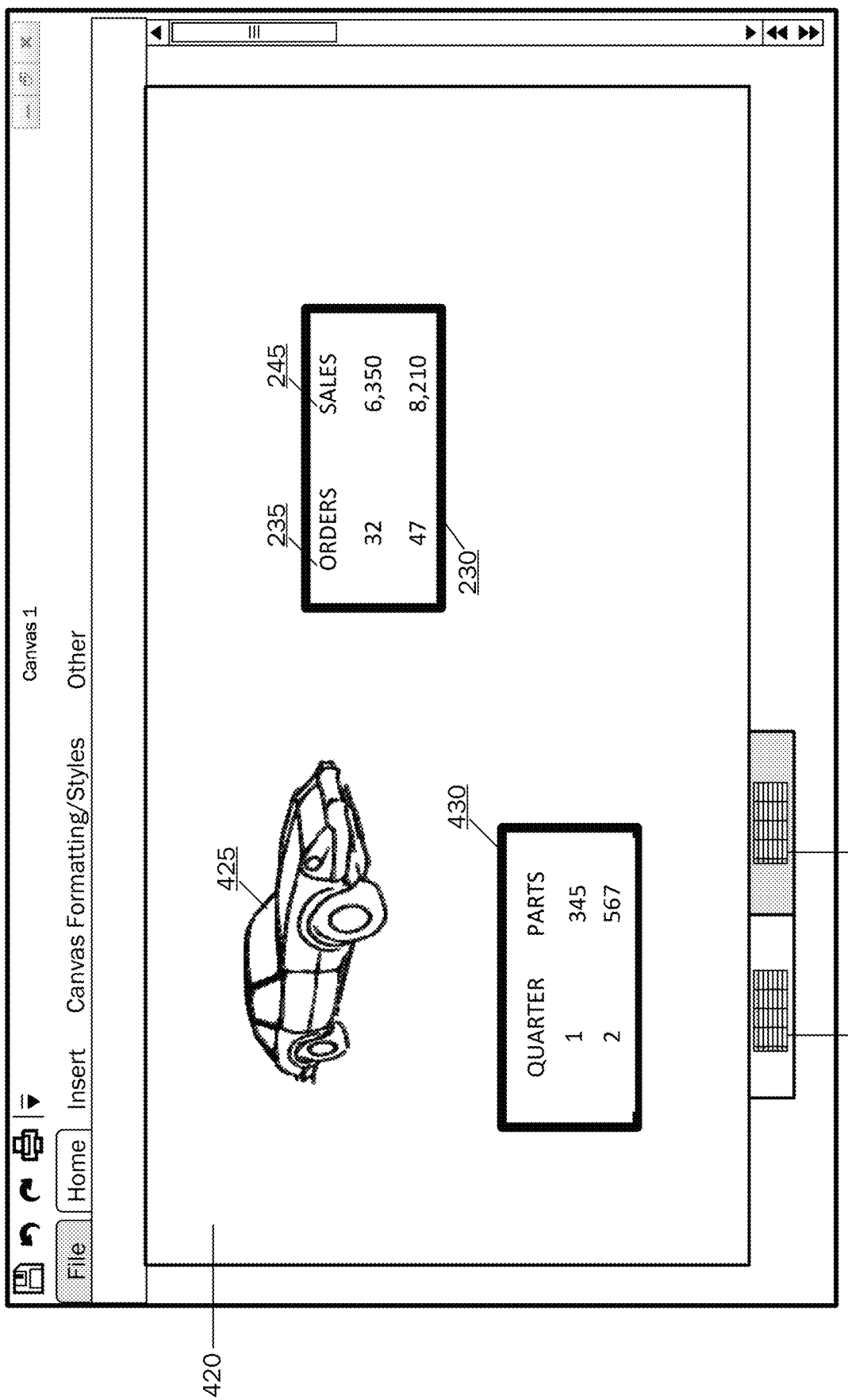
FIG. 4B illustrates depositing the pulled or moved data object from FIG. 4A onto a canvas-like user interface.

Referring now to FIG. 4A, according to another embodiment of the present invention, a canvas-like user interface may be created within a spreadsheet application that allows for a free flowing arrangement of spreadsheet-like objects, for example, tables, charts, pivot tables, cells, ranges of cells, named ranges of cells, pivot charts, and the like. Such spreadsheet-like objects may be placed onto the grid-less canvas-like user interface by pulling the objects from the grid-structured spreadsheet 210 followed by placement of the pulled or extracted objects onto the canvas, as illustrated in FIG. 4B. Each canvas may be treated as an individual document that may be displayed, printed, transmitted and otherwise utilized, or one or more canvases and one or more grid-structured spreadsheets (sheets) may be combined to form a spreadsheet document. Spreadsheet-like objects may also be natively created on the canvas as well. In other words, the objects do not need to be created in and extracted from the grid-structured spreadsheet 210 in order to be placed on the canvas. This allows users to accomplish a significant portion of their work with minimal use of the grids in the grid-structured spreadsheet 210, if desired.

Referring still to FIGS. 4A and 4B, a user first selects a "Create Canvas" function 410 for generating the canvas-like user interface 420 illustrated in FIG. 4B. As should be appreciated, the "Create Canvas" function 410 is illustrated for purposes of example only and is not exhaustive of the various means by which a spreadsheet application may enable the creation of a grid-less canvas-like user interface 420, as illustrated in FIG. 4B. The canvas-like user interface has no grid-structured spreadsheet 210, as illustrated above with reference to FIGS. 2A through 4A, meaning that no designated rows and columns and resulting array of cells are displayed in the canvas-like user interface 420. According to embodiments, data objects 230, 425, 430 disposed on the canvas-like user interface 420 may be moved around at the will and desire of the user in a free flowing manner without regard to specific location, for example, without regard to particular cells or array of cells as is typical for a grid-structured spreadsheet 210, as illustrated in FIGS. 2A through 4A. Thus, with the canvas-like user interface 420, a user may create a presentation, document, and the like having spreadsheet-like data objects, data objects, images, or other content disposed on the canvas-like user interface 420, and the user is free to move each of the disposed objects around, as desired.

For example, as illustrated in FIG. 4B, the user has generated a canvas-like worksheet wherein the user has disposed a first data object 230 (e.g., a table), a second data object 430 (e.g., a table), and an image data object 425. For example, the user may desire to create a document for presentation at a meeting having spreadsheet-like objects, (e.g., table data objects 230, 430), as well as, one or more image data objects 425 without having the clutter or visual distraction often associated with a grid-structured spreadsheet 210 having distinct columns and rows and separator lines forming individual cells.

Referring still to FIG. 4B, the two table data objects 230, 430 may be illustrative of data objects or portions of data extracted from a single spreadsheet, or each of the data objects 230, 430 may have been extracted from each of two separate spreadsheets from one spreadsheet application workbook or from two different spreadsheet application workbooks. That is, according to embodiments of the present invention, spreadsheet-like objects, such as the table data objects 230, 430, may be populated onto the canvas-like user interface 420 from one or more different spreadsheet sources. In addition, other data objects, for example, the image 425 may be populated onto the canvas-like user interface 420 from various other sources, for example, photographic libraries, clipart libraries, word processing application documents, slide presentation application documents, and the like.

As illustrated at the bottom of the user interface 420, two sheet designators 435, 440 are illustrated for showing that two spreadsheet application sheets are associated with the canvas-like user interface 420 from which the table data objects 230, 430 may have been extracted. That is, the associated spreadsheet workbook may include two sheets indicated by the sheet indicators 435, 440, and when the canvas interface is generated, then available sheets of the workbook may be identified in association with the canvas (i.e., canvas-like user interface). For example, if the user desires additional information from a spreadsheet application sheet associated with the sheet indicator 435, the user may select the indicator 435 for launching an instance of the associated sheet or for navigating to the associated sheet for extracting additional data objects or data items for placement on the canvas-like user interface 420.

In addition, the one or more spreadsheet application sheets may be treated as individual objects that may be disposed on the given canvas-like user interface 420. For example, if a first sheet 435 includes columns A through E and rows 1 through 10 as a first sheet, and if a second sheet 440 includes columns A through C and rows 1 through 5, each of the sheets, while traditional sheets in an associated spreadsheet application workbook, may be treated as individual objects that may be disposed in their entireties or in portions on the canvas-like user interface 420. Thus, according to embodiments, one or more grids (or portions of one or more grids from a grid-structured spreadsheet 210) may be disposed as data objects on the canvas-like user interface.

Referring back to FIG. 4A, the user 260 may pull a data item or data object, for example, the table data object 230, from the grid-structured spreadsheet 210, followed by dropping the pulled data object 230 onto the canvas-like user interface 420, as illustrated in FIG. 4B. That is, as described above with reference to FIGS. 2A and 2B, just as the user may pull a data object from one grid-structured spreadsheet 210 and drop the data object as a floating data object onto the same or different grid-structured spreadsheet 210, so may the user pull a data object 230 from the grid-structured spreadsheet 210 and drop the pulled data object as a floating data object onto the canvas-like user interface 420, as illustrated in FIG. 4B. Accordingly, each data object, content item, image, and the like disposed on the canvas-like user interface 420 may be in the form of a floating object that may be moved around on the user interface 420 by the user for generating a desired layout.

Figure 5A:
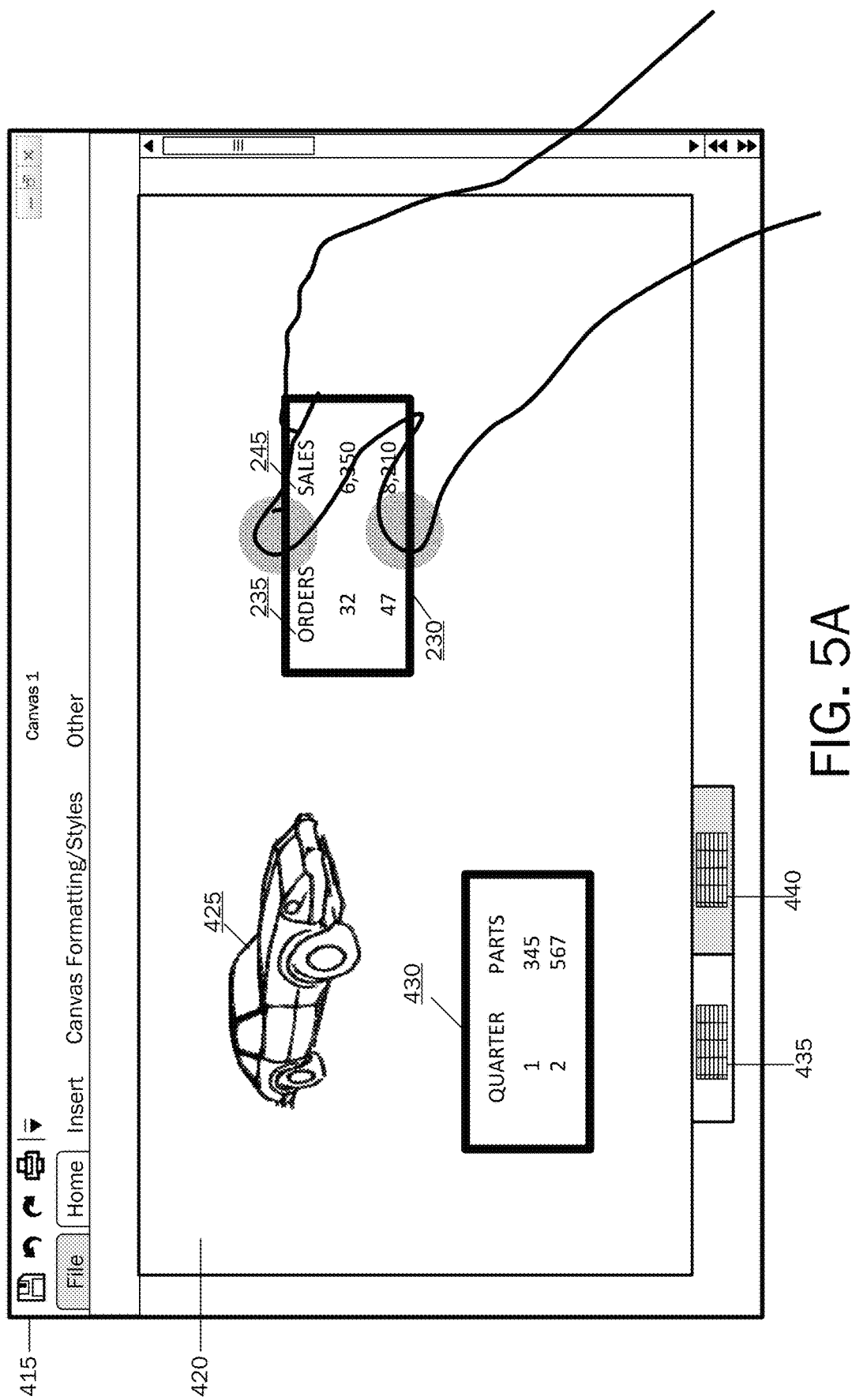
FIG. 5A illustrates pulling or moving a data object from a canvas-like user interface for depositing the pulled or moved data object onto a grid-structured spreadsheet document or for inserting or pushing the data object into a grid-structured spreadsheet document.
Figure 5B:
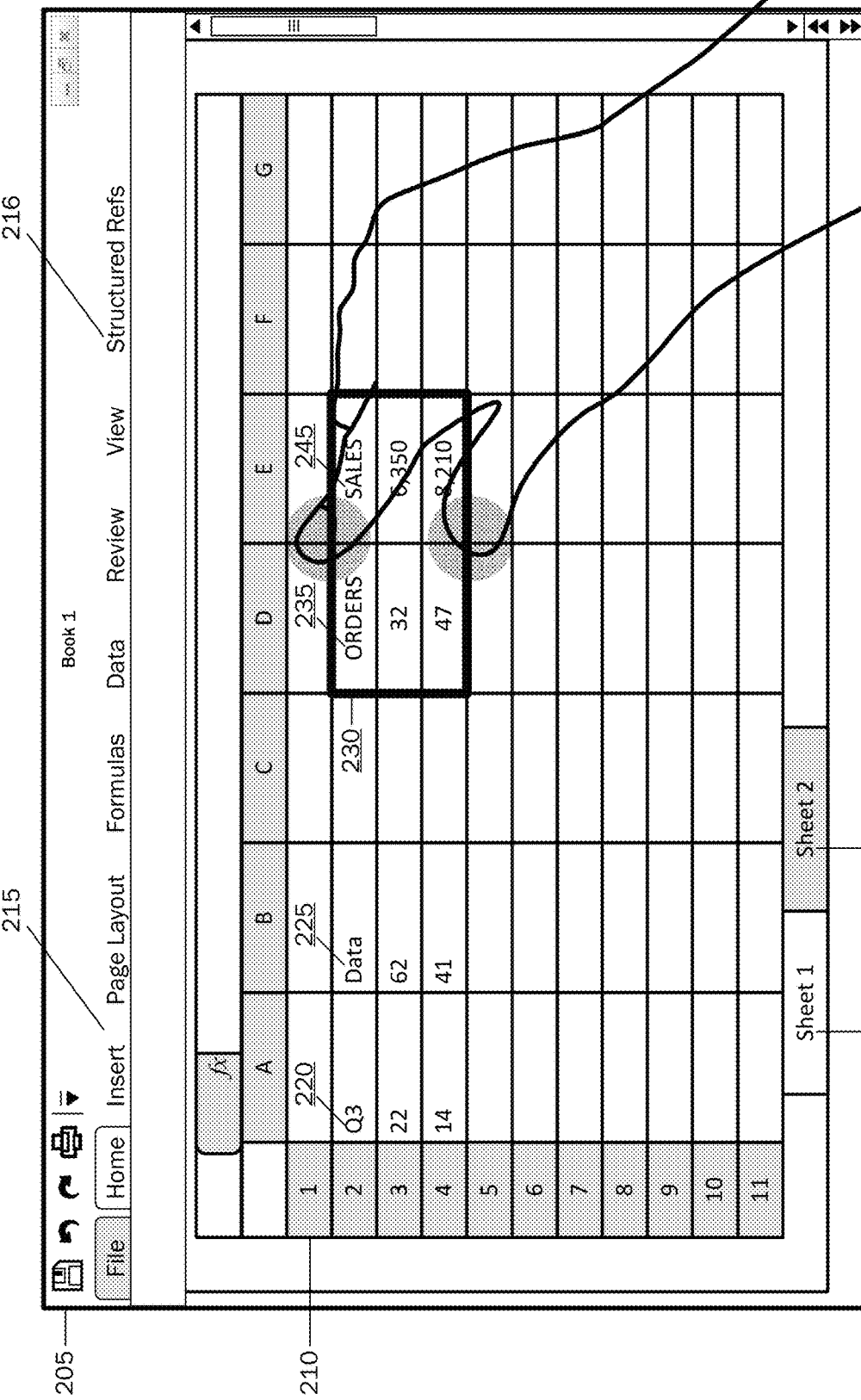
FIG. 5B illustrates depositing the data object of FIG. 5A onto a grid-structured spreadsheet document or inserting or pushing the data object of 5A into a grid-structured spreadsheet object.
Figure 6:
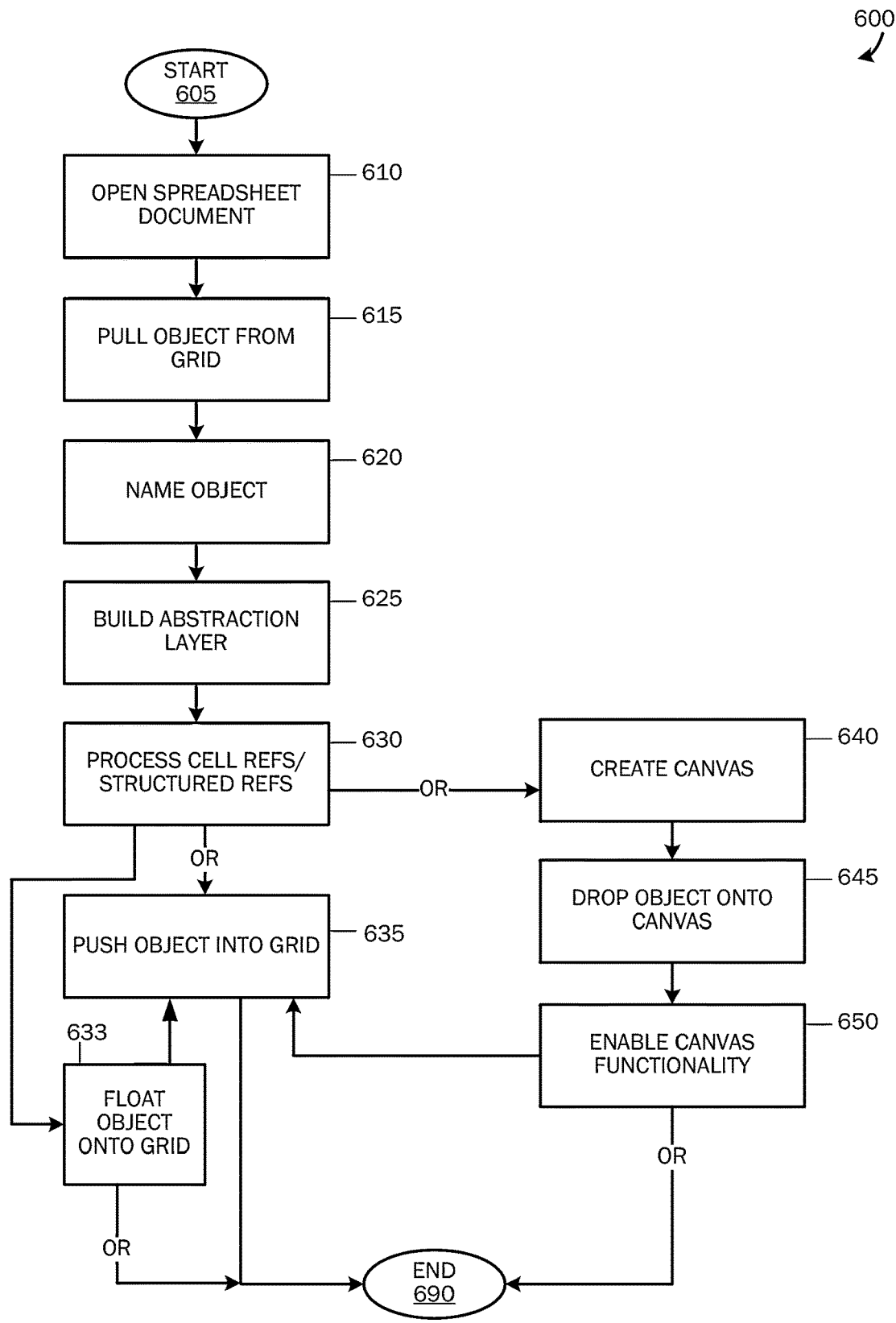
FIG. 6 is a flowchart illustrating a method of seamless grid and canvas integration in a spreadsheet application.

Referring now to FIGS. 5A and 5B, a data object 230 that has been disposed onto a canvas-like user interface 420 may be moved from the canvas 420 back onto a grid-structured spreadsheet 210, as illustrated in FIG. 5B by one of a variety of suitable means, including touch (pinching move), gesture, keyboard entry, mouse entry, voice command, or a combination thereof. In addition, movement of a data object 230 from the canvas 420 back onto the grid-structured spreadsheet 210 may be performed according to different functions, for example, cut and paste, drag and drop, and the like.

As described above with reference to FIGS. 2A, 2B, 3A and 3B, when a data object 230 is moved from the canvas-like user interface 420 to the grid-structured spreadsheet 210, as illustrated in FIG. 5B, the moved data object 230 may be dropped onto the grid-structured spreadsheet 210 as a floating data object which may be moved around on the grid-structured spreadsheet 210, as illustrated and described above with reference to FIG. 2B. Alternatively, the data object pulled from the canvas-like user interface 420 may be pushed or inserted into the grid-structured spreadsheet 210 at a desired location, as illustrated and described above with reference to FIG. 3B. Alternatively, a data object 230 pulled from the canvas-like user interface 420 may be dropped onto a second canvas-like user interface 420, as illustrated and described above with reference to FIG. 4B.

Referring back to FIGS. 2B, 3B and 5B, according to embodiments, lines separating columns and rows may be used as guide lines and snap lines for assisting a user in positioning a floating data object or in inserting a data object into a grid-structured spreadsheet. Referring to FIG. 2B, the data object 230 is illustrated as a floating object on the sheet 210. The grid lines (for example, grid lines 246, 247 separating rows 2 and 3 and columns A and B, respectively) may be used as guide lines for moving or aligning the floating object into a particular position on the sheet 210, or for inserting the object into a particular position. According to one embodiment, as the data object is moved toward one or more grid lines 246 and 247, the grid lines may serve as "snap" lines wherein, when the moved data object gets within a predetermined distance from the lines, the data object is "snapped" into position such that the guide lines or snap lines automatically become bordering lines for the data object. According to another embodiment, if the cell size of cells located in a position to which the data object is moved are different from the cell sizes of the pulled and moved data object, the data object may be automatically resized to match the cell sizes of the point at which the data object is deposited or inserted.

According to embodiments, one or more grid-structured spreadsheets (sheet) and one or more canvas-like user interfaces (canvas) may be combined together to form a single spreadsheet document (also known as a "workbook"), and a user may freely navigate between any of the canvases and sheets as desired. In addition, data objects may be moved between each of the sheets or canvases interchangeably as described herein. In addition, individual sheets and/or canvases may be shared, published, or otherwise utilized between a plurality of computing devices 105, 110, 120, 125,135 from device-to-device directly or via a distributed computing network via a server-based system, as described above with reference to FIG. 1. That is, all functionality typically associated with a spreadsheet application sheet or workbook may be utilized for the canvas-like user interfaces 420, for example, sharing, enabling collaboration, publishing, viewing via web service applications 140, and the like.

According to embodiments, when a data object is moved from a grid-structured spreadsheet 210 associated with a traditional spreadsheet application sheet to another grid-structured spreadsheet, or when a data object is moved from a grid-structured spreadsheet 210 to a canvas-like user interface 420, a moved, floating, or subsequently inserted (in a case of insertion of a data object into a grid-structured) object may maintain relationships including computational relationships back to the original grid-structured spreadsheet 210 from which the object was extracted. According to embodiments, and as will be described in further detail below, the ability to pull a data item, collection of data items, or data object from the grid-structured spreadsheet 210 to allow the pulled data to float on the same or different spreadsheet is enabled by changing the direct dependencies of pulled data items to particular grid-structured cells and by supporting structured references between pulled data items and the grid-structured spreadsheet 210 from which they are pulled. In other words, a data item may be disconnected from the data/computational model of the spreadsheet causing the data item to no be updated. Although no longer participating in calculations or other updates, the data item may still shows the last value. In various embodiments, the dependencies of the data item remain as structured references.

Such data and computational relation back to the original grid-structure may be accomplished through use of structured references between components of moved data objects and the original grid-structured spreadsheet 210. For example, referring back to FIGS. 2A and 2B, prior to pulling the data object 230 from the grid-structured spreadsheet 210, the table data object 230 consisted of two columns and three rows of data positioned in columns D and E and rows 2, 3, and 4. According to the example table data object 230, the "Orders" data at position D3 corresponds to the "Sales" data at position E3. And, as should be appreciated, the "Sales" data at position E3 may be the result of a computational function, for example, multiplying the "Orders" value at position D3 against a price per order found in another location in the grid-structured sheet 210. According to embodiments, when the table data object 230 is pulled from the grid-structured sheet 210 and is dropped onto the grid-structured sheet 210 as a floating object, as illustrated in FIG. 2B, or when the object is dropped onto the canvas-like user interface 420, as illustrated in FIG. 4B, the individual data items contained in the pulled data object 230, along with computational functions and relationships of the data items contained in the data object 230 are maintained. Thus, as illustrated in FIGS. 2B and 4B, when the data objects are dropped onto the grid-structured spreadsheet 210 or onto the canvas-like user interface 420, the data contained in the data object and the computational relationships between the data contained in the data object 230 are maintained.

For example, after the data object 230 is dropped onto the grid-structured spreadsheet 210 or onto the canvas-like user interface 420, if the user changes a data item, for example, the "Orders" data item of 32 orders, a "Sales" figure associated with the 32 order items will automatically change owing to the computational function associated with the cell containing the sales figure and the maintenance of its relationship with the associated orders cell. According to embodiments, the maintenance of relationships between data and computational functions contained in or associated with the moved data object back to corresponding data and computational functions contained in or associated with the grid-structured sheet from which the data object was pulled or moved is accomplished via structured references between data items and computational functions contained in the moved data object back to corresponding data and computational functions contained in or associated with the grid-structured sheet. That is, while the data item of 32 orders originally contained at position D3 in the example sheet, illustrated in FIG. 2A, may be moved to a floating position, as illustrated in FIG. 2B, or may be re-inserted into a different location in the sheet, as illustrated in FIG. 3B, or may be dropped onto a canvas-like user interface 420, as illustrated in FIG. 4B, the data contained in a given cell, for example, the data item of 32 orders originating at cell position D3 is not referenced back to the particular cell position D3, but instead is referenced to the data or computational function originally contained at that position through a structured reference, because, as illustrated in FIG. 3B, the original data and associated computational functions for a sheet into which a data object is inserted or onto which another data object is moved may be different from the original grid-structured sheet from which the data object was originally pulled or moved.

According to a structured references relationship between a pulled and moved data object back to the original grid-structured spreadsheet from which it was received, data and computational functions in or associated with the pulled and moved data object must be referenced back to corresponding data and computational functions without relating back to specific cell locations. For example, referring back to FIGS.

2A and 3B, data contained at cell positions D3 and D4 are moved with the table data object 230 and are reinserted into the sheet 210 such that the corresponding data in the moved table data object 230 is now positioned at cell positions B3 and B4, respectively. However, because the table data object 230 was re-inserted into a position between the columns of data that originally were positioned in columns A and B, the data 225 that was originally positioned in column B is now positioned in column D such that new data items are positioned at cell positions D3 and D4, respectively. Thus, if the cells contained in the moved data object 230 are referenced back to the original cells on a cell-to-cell basis, then the computational functionality (e.g., calculation of sales data as a function of orders data) would generate an erroneous outcome, because data in the original cells D3 and D4 has been changed owing to the insertion of the moved table data object 230 into a position in columns B and C.

This is particularly important for avoiding collisions between a moved and possibly modified data object whether the object is reinserted or not. For example, referring still to FIG. 3B, without the structured references relationship, if the original data in columns A and B represent a pivot table or other complex spreadsheet function, inserting the data object 230 likely would cause a collision with the functioning of the pivot table. For another example, if a data object is pulled having two rows of data, but is modified to add another row of data before it is reinserted back into the same spreadsheet, the expansion of the data object may cause a collision with another object, for example, a pivot table positioned immediately beneath the originally pulled data object. However, by replacing cell references in the pulled data object with structured references to the underlying data and/or functionality, then the pulled data object may be modified and/or re-inserted without creating an error condition for other data objects in the spreadsheet.

According to embodiments of the present invention, data relationships and computational function relationships between moved data objects and corresponding data and computational functions contained in or associated with the original sheet from which the data objects are extracted are maintained through structured references, wherein data and computational functions contained in a moved data object are referenced back to the correct corresponding data and computational functions regardless of where the corresponding data items and computational functions are moved in the original grid-structured spreadsheet. According to one embodiment, these structured references are created and maintained through an abstraction layer built for all data items or data objects in a spreadsheet in a way that allows each data item or data object to abstract a cell location and/or cell behavior (e.g., computational function). Thus, each data item or data object may index data and computational functions contained therein and map the data items and computational functions contained therein to the corresponding data items and computational functions contained in the grid-structured spreadsheet from which the data items or data objects are extracted. Regardless of where a particular data object is moved, for example, to another grid-structured spreadsheet, or to a canvas-like user interface 420, each data item and/or computational function may be mapped back to the appropriate data item and/or computational function in the grid-structured spreadsheet from which it was extracted and referenced by other data objects and items. For example, if cell D4 is extracted from the grid-structured spreadsheet and made into a floating data object, another cell that references cell D4 would be updated to reference the floating data object using the structured reference. Thus, a formula such as SUM(C3, D4) would be updated to replace D4 with the structured reference (e.g., myFloatingRange. [0] [4]).

When a data object 230 is moved, as described above, then the object may communicate with the original grid-structured spreadsheet and other data objects via the abstraction layer, as required. According to embodiments, syntax associated with such structured references points data items and/or computational functions contained in a moved data object to indexed associated data and/or computational functions without the need of pointing directly to a particular cell location for finding required data and/or computational functions. According to one embodiment, a naming construct may be utilized wherein each data object 230 moved from a given grid-structured sheet to another sheet or canvas-like user interface, or vice versa, may be assigned a name or other identification to allow all other data items and/or data objects in a spreadsheet to reference the named object via its name or other identification so that structured referencing syntax may be used for accessing local items in one or more grid-structured sheets (e.g., cells, ranges of cells, data objects, etc.) or any desired spreadsheet application operation or function including local or global calculation change, and the like.

Referring still to FIGS. 2A through 5B, a "Structured References" button 216 is illustrated in the user interface 205 for creating and utilizing structured references between data objects and grid-structured spreadsheets, as described above. As should be appreciated, the button 216 is for purposes of illustration only and is not exhaustive of the various ways in which structured reference functionality may be applied to one or more data objects. For example, the user interface 205 may provide for functionality for allowing the user to convert an object from spreadsheet cell references to structured references, as described above. For example, upon selection of a given data object 230, before moving the data object 230 to a different location, a user may select a functionality provided via the user interface 205 for manually converting cell references to structured references so that a cell contained in a moved data object no longer references a particular cell or cells contained in the original grid-structured sheet location, but instead, references the data and/or computational functions associated therein through structured references, as described above. Alternatively, the conversion of spreadsheet cell references to structured references may occur automatically when a data item or object is pulled from the grid-structured sheet, as described above.

According to one embodiment, a default choice may be provided to a user that may change dynamically based on an object type or a number of computational functions (e.g., formulas associated with a given data item or object). For example, when a user pulls a particular data object from a grid-structured sheet, the associated cell references may be automatically converted to structured references, as described above, but when a moved data object is pushed into or dropped onto a grid-structured spreadsheet, as illustrated above with reference to FIG. 3B, then the structured references may not be converted back to cell references so that references between data items and computational functions back to the grid-structured sheet are maintained, as described above.

According to another embodiment, in some cases, references between a moved data object and the original grid-structured spreadsheet from which the data object was extracted may be disconnected such that the data items and any computational functions associated with the moved object will continue to work relative to each other, but such that changes in the original grid-structured sheet will not be reflected in the moved object. Thus, a user interface function may be provided for allowing a user to manually disconnect references between an object to be moved before the object is moved so that the object may be a freestanding data object in the new location. For example, if a user desires to create a presentation using the canvas-like user interface 420, illustrated above with reference to FIGS. 4B and 5A, the user may wish to disconnect the moved object from the original grid-structured sheet from which it is extracted so that if any associated data or computational functions contained in the original grid-structured sheet are subsequently changed, the object placed on the canvas-like user interface 420 for the user's presentation will not be dynamically changed which may upset the purpose of the presentation being created by moving the example data object to the canvas.

Having described an exemplary operating environment and various aspects of embodiments to the present invention with reference to FIGS. 1 through 5B, FIG. 6 is a flowchart illustrating a method of seamless grid and canvas integration in a spreadsheet application. The method 600 begins at operation 605 and moves to operation 610 where a spreadsheet document (e.g., spreadsheet workbook) containing one or more grid-structured sheets 210 is opened for use. At operation 615, a user decides to pull a data object 230, for example, an individual cell, a range of cells, a table, a chart, a pivot table, a named range of cells, a pivot chart, or the like from an available spreadsheets 210 for deposit onto a spreadsheet as a floating object, for insertion into a spreadsheet as an inserted object, or for deposit onto a canvas-like user interface 420, as described above.

At operation 620, the pulled data object may be named or otherwise identified so that data and/or computational functions in or associated with the pulled data object may be referenced back to the other data and other computational functions contained in the spreadsheet from which the data object was pulled. At operation 625, an abstraction layer for allowing communication between the pulled object and the spreadsheet from which the object was pulled is built.

At operation 630, cell references are converted to structured references, as described above, for allowing communication between the pulled object and associated cells and/or computational functions via the abstraction layer. As described above, if desired, references between data items and computational functions contained in the pulled data object may be selectively disconnected or broken to allow the pulled object to operate as a free standing data object in a subsequent location.

At operation 633, the pulled object may be floated onto the same or another grid-structured spreadsheet and may be moved by the user to various positions on the spreadsheet, as described above with reference to FIG. 2B. The pulled object subsequently may be pushed back into the original spreadsheet or to another spreadsheet at operation 635, as desired.

Alternatively, at operation 635, instead of floating the pulled object, it may be pushed into the grid-structured spreadsheet from which it was extracted at any location desired by the user, or the pulled data object may be pushed into the grid of a different spreadsheet.

Alternatively, at operation 640, the user may selective create a canvas-like user interface 420, as described above with reference to FIGS. 4A and 4B, and at operation 645, the pulled object may be dropped onto the canvas and may be moved about on the canvas, as desired.

At operation 650, any functionality available from the spreadsheet application for operating on data objects contained in or associated with the canvas-like user interface 420 may be enabled.

As described above, after any of the operations 633, 635 or 645, any or all of the moved data items or data objects may be extracted from their deposited locations and may be moved to other locations in other grid-structured spreadsheets or other canvas-like user interfaces, as desired. In addition, data objects pulled from a given spreadsheet or canvas-like user interface may be shared with or sent to other users for any suitable use, including for use in accordance with embodiments of the present invention with other spreadsheet application worksheets and canvases, as described herein.

While the invention has been described in the general context of program modules that execute in conjunction with an application program that runs on an operating system on a computer, those skilled in the art will recognize that the invention may also be implemented in combination with other program modules. Generally, program modules include routines, programs, components, data structures, and other types of structures that perform particular tasks or implement particular abstract data types.

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 7:
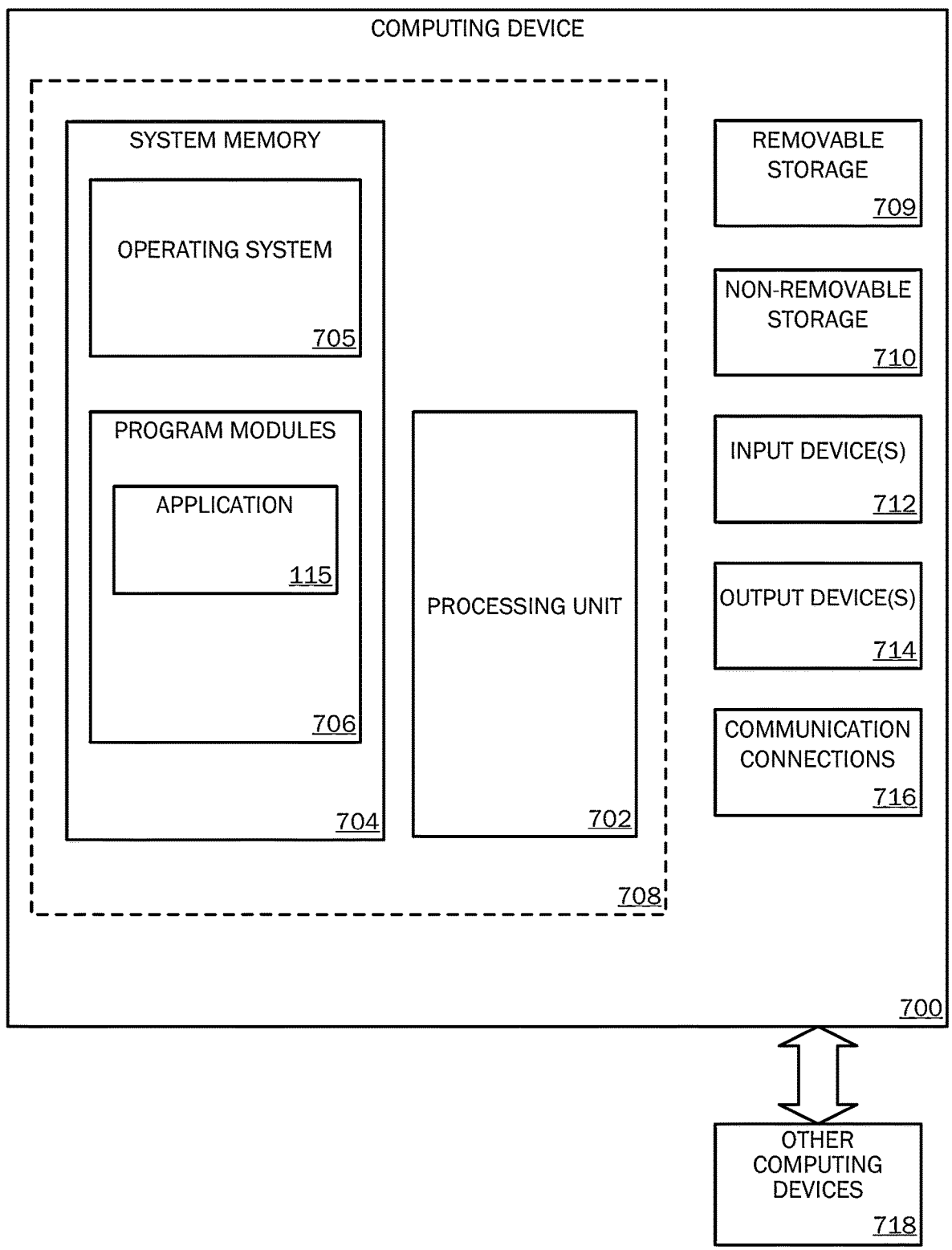
FIG. 7 is a block diagram illustrating example physical components of a computing device with which embodiments of the invention may be practiced.
Figure 8A:
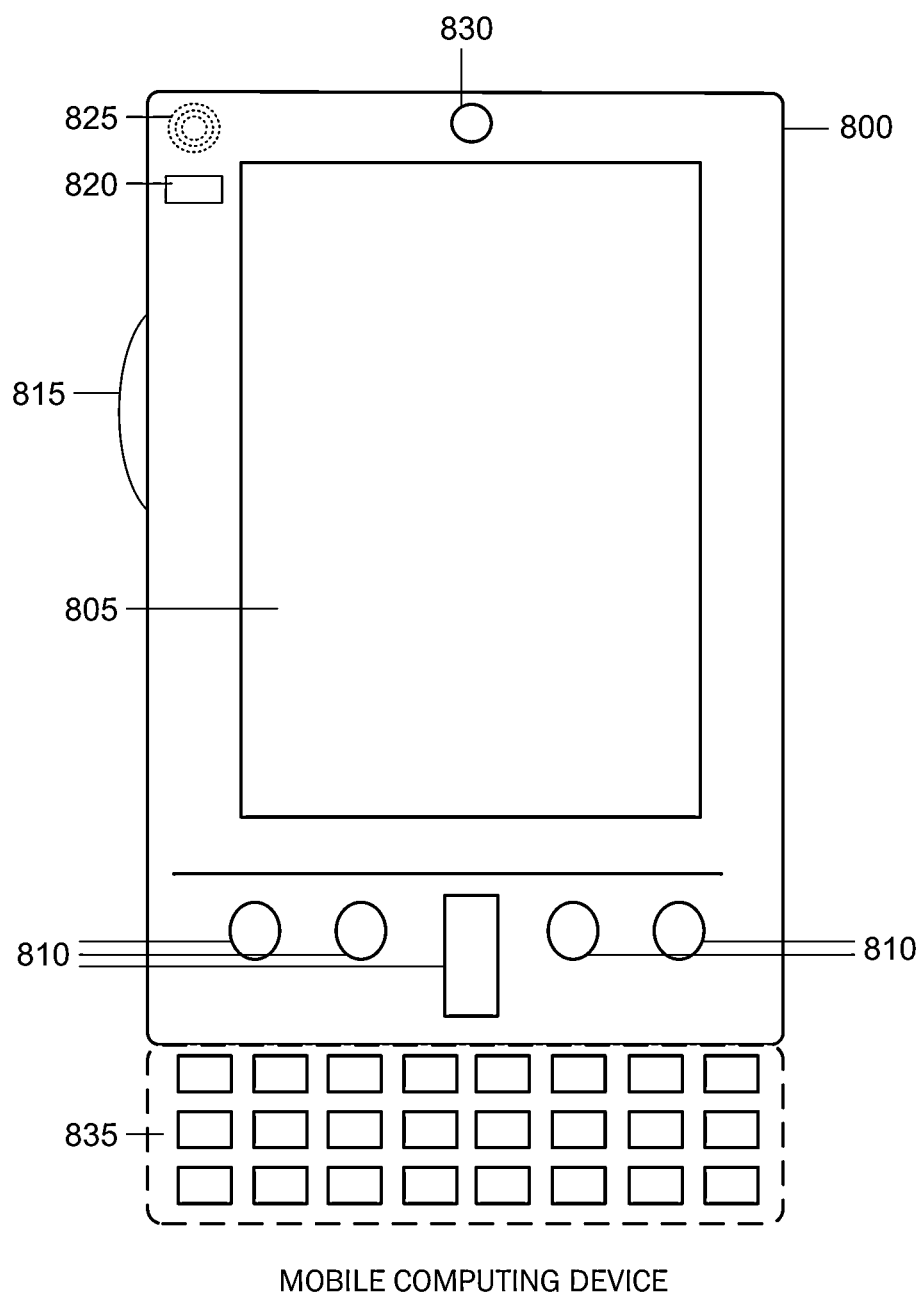
FIGS. 8A and 8B are simplified block diagrams of a mobile computing device with which embodiments of the present invention may be practiced.
Figure 8B:
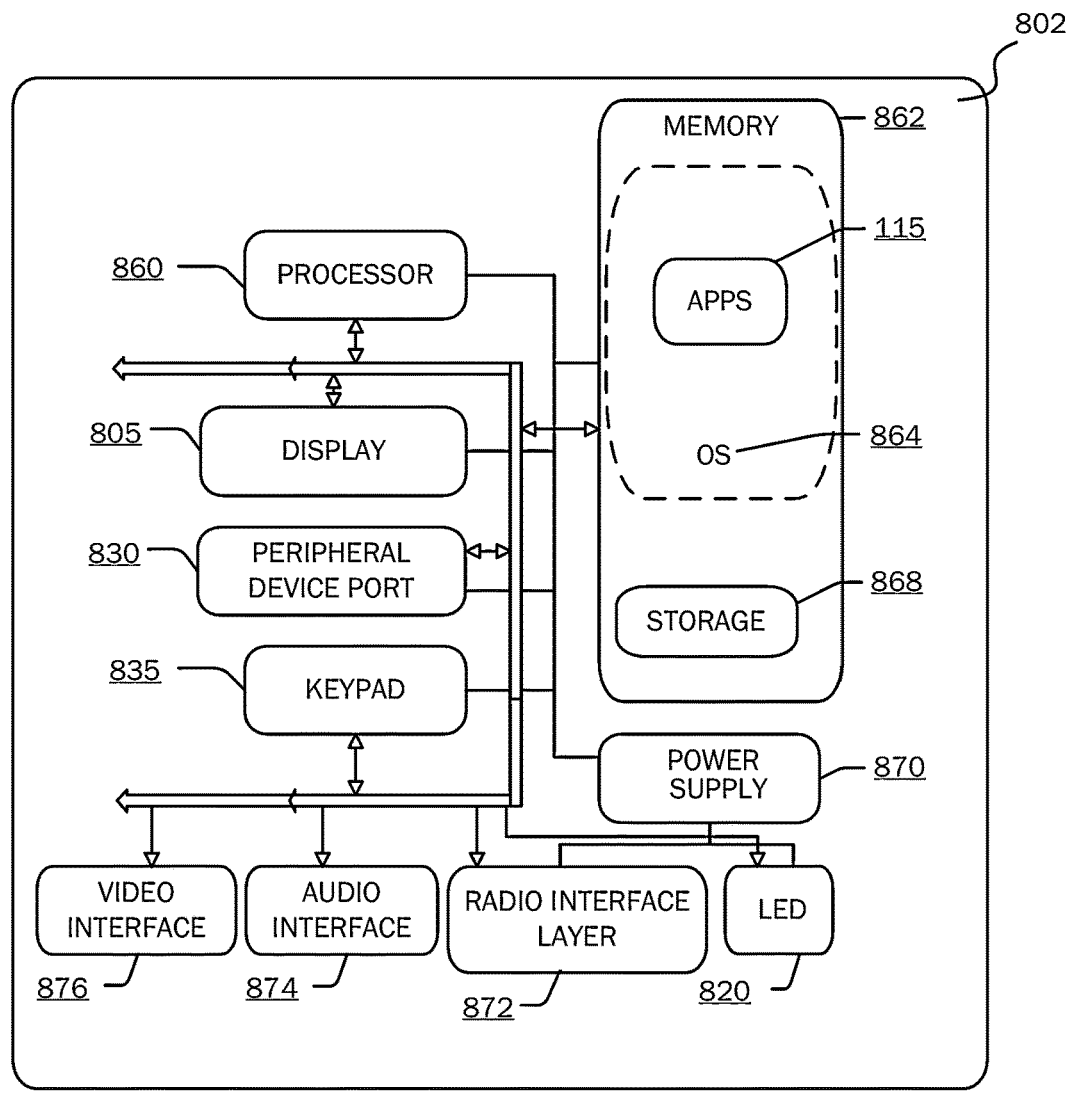
Figure 9:
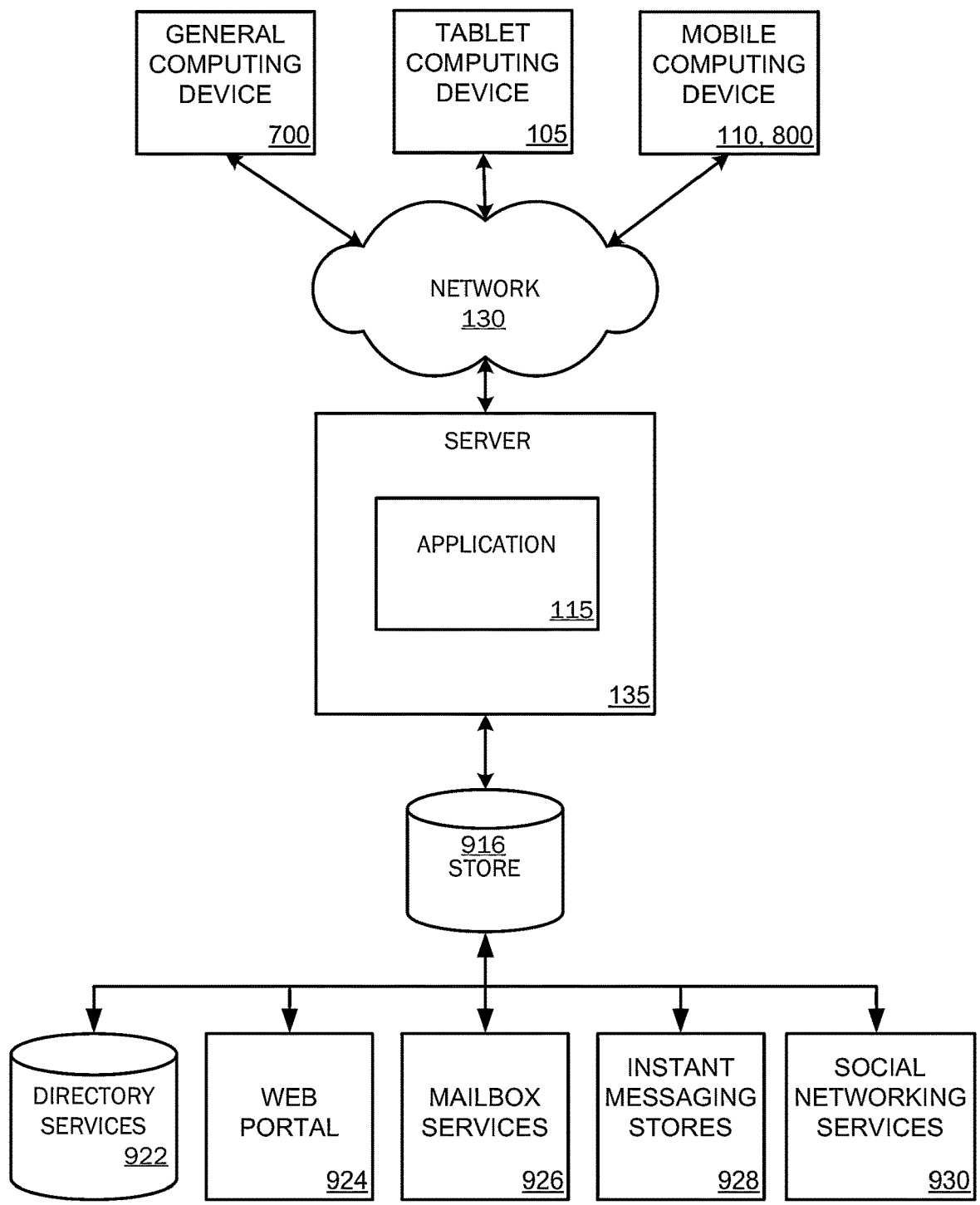
FIG. 9 is a simplified block diagram of a distributed computing system in which embodiments of the present invention may be practiced.

FIGS. 7-9 and the associated descriptions provide a discussion of a variety of operating environments in which embodiments of the invention may be practiced. However, the devices and systems illustrated and discussed with respect to FIGS. 7-9 are for purposes of example and illustration and are not limiting of a vast number of computing device configurations that may be utilized for practicing embodiments of the invention, described herein.

FIG. 7 is a block diagram illustrating physical components (i.e., hardware) of a computing device 700 with which embodiments of the invention may be practiced. The computing device components described below may be suitable for the computing devices 105, 110, 120, 125, 135 described above. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program modules 706 suitable for running a variety of applications 720. The operating system 705, for example, may be suitable for controlling the operation of the computing device 700. Furthermore, embodiments of the invention may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706 may perform processes including, but not limited to, one or more of the stages of the method 600 illustrated in FIG. 6. Other program modules that may be used in accordance with embodiments of the present invention may include applications, such as, spreadsheet applications, notes applications, Internet browser applications, electronic mail and contacts applications, word processing applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to use of web page content may be operated via application-specific logic integrated with other components of the computing device 700 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 700 may also have one or more input device(s) 712 such as a keyboard, a mouse, a pen, a sound input device, a touch input device, etc. The output device(s) 714 such as a display, speakers, a printer, etc. may also be included. The aforementioned devices are examples and others may be used. The computing device 700 may include one or more communication connections 716 allowing communications with other computing devices 718. Examples of suitable communication connections 716 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700.

FIGS. 8A and 8B illustrate a mobile computing device 800, for example, a mobile telephone 110, a smart phone 110, a tablet-style personal computer 105, a laptop computer, and the like, with which embodiments of the invention may be practiced. With reference to FIG. 8A, one embodiment of a mobile computing device 800 for implementing the embodiments is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative embodiments, mobile computing device 800 may incorporate more or less input elements. For example, the display 805 may not be a touch screen in some embodiments. In yet another alternative embodiment, the mobile computing device 800 is a portable phone system, such as a cellular phone. The mobile computing device 800 may also include an optional keypad 835. Optional keypad 835 may be a physical keypad or a "soft" keypad generated on the touch screen display. In various embodiments, the output elements include the display 805 for showing a graphical user interface (GUI), a visual indicator 820 (e.g., a light emitting diode), and/or an audio transducer 825 (e.g., a speaker). In some embodiments, the mobile computing device 800 incorporates a vibration transducer for providing the user with tactile feedback. In yet another embodiment, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one embodiment of a mobile computing device. That is, the mobile computing device 800 can incorporate a system (i.e., an architecture) 802 to implement some embodiments. In one embodiment, the system 802 is implemented as a "smart phone" capable of running one or more applications (e.g., browser, e-mail, calendaring, contact managers, messaging clients, games, and media clients/players). In some embodiments, the system 802 is integrated as a computing device, such as an integrated personal digital assistant (PDA) and wireless phone.

One or more application programs may be loaded into the memory 862 and run on or in association with the operating system 864. Examples of the application programs include phone dialer applications, e-mail applications, personal information management (PIM) applications, word processing applications, spreadsheet applications, Internet browser applications, notes applications, messaging applications, and so forth. The system 802 also includes a non-volatile storage area 868 within the memory 862. The non-volatile storage area 868 may be used to store persistent information that should not be lost if the system 802 is powered down. The application programs may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800.

The system 802 has a power supply 870, which may be implemented as one or more batteries. The power supply 870 might further include an external power source, such as an AC adapter or a powered docking cradle that supplements or recharges the batteries.

The system 802 may also include a radio 872 that performs the function of transmitting and receiving radio frequency communications. The radio 872 facilitates wireless connectivity between the system 802 and the "outside world," via a communications carrier or service provider. Transmissions to and from the radio 872 are conducted under control of the operating system 864. In other words, communications received by the radio 872 may be disseminated to the application programs via the operating system 864, and vice versa.

The visual indicator 820 may be used to provide visual notifications and/or an audio interface 874 may be used for producing audible notifications via the audio transducer 825. In the illustrated embodiment, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with embodiments of the present invention, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio 872 or via a distributed computing network. Similarly, such data/information may be readily transferred between computing devices for storage and use according to well-known data/information transfer and storage means, including electronic mail and collaborative data/information sharing systems.

FIG. 9 illustrates one embodiment of the architecture of a system for providing web page content utilization seamless use of grid-structured and canvas-like spreadsheets, as described above. Content developed, interacted with, or edited in association with embodiments of the invention may be stored in different communication channels or other storage types. For example, various documents and stored content items may be stored using a directory service 922, a web portal 924, a mailbox service 926, an instant messaging store 928, or a social networking site 930. The grid-structured and canvas-like spreadsheets functionality described herein may use any of these types of systems or the like for enabling data utilization, as described herein. A server 135 may provide the grid-structured and canvas-like spreadsheet functionality to clients. As one example, the server 135 may be a web server providing the grid-structured and canvas-like spreadsheet functionality over the web. The server 135 may provide the output of the grid-structured and canvas-like spreadsheet functionality over the web to clients through a network 130. By way of example, the client computing device may be implemented and embodied in a personal computer 700, a tablet computing device 105 and/or a mobile computing device 110 (e.g., a smart phone), or other computing device. Any of these embodiments of the client computing device 700, 105, 110, 120, 125 may obtain content from the store 916.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

We claim:

1. A computer-implemented method of managing data in an electronic spreadsheet, comprising:
    causing display of an electronic document wherein the electronic document is a grid-structured spreadsheet in which data is arranged in one or more cells of a grid;
    causing display of a data object in the grid-structured spreadsheet, the data object positioned in one or more other cells of the grid-structured spreadsheet;
    receiving a pulling of the data object out of the grid-structured spreadsheet such that the pulled data object is removed from the one or more other cells in which it is positioned;
    depositing the pulled data object such that the pulled data object is cause to be displayed on top of the grid-structured spreadsheet, the pulled data object is not positioned in the one or more other cells, and the deposited pulled data object when displayed on top of the grid-structured spreadsheet may be moved freely on the grid-structured spreadsheet without being positioned in any cells of the grid-structured spreadsheet; and
    updating the pulled data object while displayed as freely moveable, based on one or more of the following:
        direct editing of a component of the pulled data object by a user;
        recalculation of the spreadsheet while maintaining computational functions associated with the pulled data object, wherein each data item of the pulled data object may be mapped back to the data item from which it was extracted; and
        adjustment of a formula within the grid-structured spreadsheet, wherein the formula provides a computational function associated with the pulled data object.

2. The method of claim 1, further comprising after depositing the pulled data object on the grid-structured spreadsheet, enabling one or more guide lines in the grid-structured spreadsheet to automatically align and position the deposited pulled data object on the grid-structured spreadsheet at a particular position.

3. The method of claim 2, further comprising automatically re-sizing the deposited pulled data object to a display size corresponding to one or more cells onto which the deposited pulled data object is positioned.

4. The method of claim 1, further comprising in response to receiving the pulling of the data object out of the grid-structured spreadsheet, creating a structured reference between any data items or computational functions in or associated with the pulled data object and corresponding data items or computational functions in or associated with the grid-structured spreadsheet such that relationships between data items or computational functions in or associated with the pulled data object and corresponding data items or computational functions in or associated with the grid-structured spreadsheet are maintained after the data object is pulled from the grid-structured spreadsheet.

5. The method of claim 1, wherein causing display of a data object in the grid-structured spreadsheet includes causing display of one or more of: a data object in a cell; a data object in a range of cells; a table; a chart; a pivot table; a pivot chart; and a named range of cells.

6. The method of claim 1, further comprising
    receiving a selection to push the pulled data object back into the grid-structured spreadsheet; and
    inserting the pulled data object back into the grid-structured spreadsheet such that the pulled data object is positioned in one or more cells of the grid-structured spreadsheet.

7. The method of claim 6, wherein inserting the pulled data object back into the grid-structured spreadsheet includes inserting the pulled data object into a second grid-structured spreadsheet and positioning the pulled data object in one or more cells of the second grid-structured spreadsheet.

8. The method of claim 1, wherein instead of depositing the pulled data object on the grid-structured spreadsheet, depositing the pulled data object on a canvas-like user interface such that the data object may be moved freely on the canvas-like user interface.

9. The method of claim 8, further comprising in response to receiving the pulling of the data object out of the grid-structured spreadsheet, creating a structured reference between any data items or computational functions in or associated with the pulled data object and corresponding data items or computational functions in or associated with the grid-structured spreadsheet such that relationships between data items or computational functions in or associated with the pulled data object and corresponding data items or computational functions in or associated with the grid-structured spreadsheet are maintained after the data object is pulled from the grid-structured spreadsheet.

10. The method of claim 8, further comprising:
    receiving a selection to pull the data object deposited on the canvas-like user interface and pushing the pulled data object back into the grid-structured spreadsheet; and
    inserting the pulled data object back into the grid-structured spreadsheet such that the pulled data object is positioned in one or more cells of the grid-structured spreadsheet.

11. The method of claim 1, wherein updating the pulled data object while freely moveable comprises at least one of:
    updating the pulled data object in response to changes made by the user to a data item located at another place in the grid-structured spreadsheet; and
    updating the pulled data object when the spreadsheet recalculates.

12. The method of claim 1 wherein the pulled data object comprises more than one cell and at least one cell of the more than one cell of pulled data object is updated while displayed as freely moveable.

13. A computer-implemented method of utilizing spreadsheet objects in an electronic canvas, comprising:
    displaying an electronic document wherein the electronic document is a grid-structured spreadsheet in which data is arranged in one or more cells of a grid;
    displaying a data object in the grid-structured spreadsheet, the data object positioned in one or more other cells of the grid-structured spreadsheet;
    receiving a pulling of the data object out of the grid-structured spreadsheet such that the pulled data object is removed from the one or more other cells in which it is positioned;
    depositing the pulled data object such that the pulled data object is displayed on a canvas-like user interface, and the pulled data object may be moved freely on the canvas-like user interface; and updating the pulled data object while displayed as freely moveable, based on one or more of the following:
- direct editing of a component of the pulled object by a user;
- recalculation of the spreadsheet while maintaining computational functions associated with the pulled data object, wherein each data item of the pulled data object may be mapped back to the data item from which it was extracted; and
- adjustment of a formula within the grid-structured spreadsheet, wherein the formula provides a computational function associated with the pulled data object.

14. The method of claim 13, further comprising in response to receiving the pulling of the data object out of the grid-structured spreadsheet, creating a structured reference between any data items or computational functions in or associated with the pulled data object and corresponding data items or computational functions in or associated with the grid-structured spreadsheet such that relationships between data items or computational functions in or associated with the pulled data object and corresponding data items or computational functions in or associated with the grid-structured spreadsheet are maintained after the data object is pulled from the grid-structured spreadsheet.

15. The method of claim 13, wherein displaying a data object in the grid-structured spreadsheet includes displaying one or more of: a data object in a cell; a data object in a range of cells; a table; a chart; a pivot table; a pivot chart; and a named range of cells.

16. The method of claim 13, further comprising:
- receiving a selection to pull the data object deposited on the canvas-like user interface and pushing the pulled data object back into the grid-structured spreadsheet; and
- inserting the pulled data object back into the grid-structured spreadsheet such that the pulled data object is positioned in one or more cells of the grid-structured spreadsheet.

17. The method of claim 16, wherein inserting the pulled data object back into the grid-structured spreadsheet includes inserting the pulled data object into a second grid-structured spreadsheet and positioning the pulled data object in one or more cells of the second grid-structured spreadsheet.

18. The method of claim 13, further comprising:
- receiving a selection to pull the data object deposited on the canvas-like user interface; and
- depositing the pulled data object on a second canvas-like user interface such that the deposited data object may be moved freely on the second canvas-like user interface.

19. The method of claim 13, further comprising:
- associating the canvas-like user interface and the grid-structured spreadsheet together as part of a spreadsheet document and allowing navigation from the grid-structured spreadsheet to the canvas-like user interface and vice versa in the spreadsheet document.

20. The method of claim 19, wherein a portion or all of the grid-structured spreadsheet may be deposited on the canvas-like user interface as a data object that may be moved freely about on the canvas-like user interface.

21. The method of claim 19, further comprising adding one or more additional grid-structured spreadsheets and one or more additional canvas-like user interfaces to the spreadsheet document.

22. A system for managing data in an electronic spreadsheet, comprising:
- one or more processors; and
- a memory coupled to the one or more processors, the one or more processors operable to:
  - display an electronic document wherein the electronic document is a grid-structured spreadsheet in which data is arranged in one or more cells of a grid;
  - display a data object in the grid-structured spreadsheet, the data object positioned in one or more other cells of the grid-structured spreadsheet;
  - receive a pulling of the data object out of the grid-structured spreadsheet such that the pulled data object is removed from the one or more other cells in which it is positioned;
  - deposit the pulled data object such that the pulled data object is displayed on top of the grid-structured spreadsheet, the pulled data object is not positioned in the one or more other cells, and the deposited pulled data object when displayed on top of the grid-structured spreadsheet may be moved freely on the grid-structured spreadsheet without being positioned in any cells of the grid-structured spreadsheet;
  - update the pulled data object while displayed as freely moveable, based on one or more of the following:
    - direct editing of a component of the pulled data object by a user;
    - recalculation of the spreadsheet while maintaining computational functions associated with the pulled data object, wherein each data item of the pulled data object may be mapped back to the data item from which it was extracted; and
    - adjustment of a formula within the grid-structured spreadsheet, wherein the formula provides a computational function associated with the pulled data object; and
  - create a structured reference between any data items or computational functions in or associated with the pulled data object and corresponding data items or computational functions in or associated with the grid-structured spreadsheet such that relationships between data items or computational functions in or associated with the pulled data object and corresponding data items or computational functions in or associated with the grid-structured spreadsheet are maintained after the data object is pulled from the grid-structured spreadsheet.

* * * * *